(12) United States Patent
Hayakawa et al.

(10) Patent No.: US 12,344,317 B2
(45) Date of Patent: Jul. 1, 2025

(54) REAR VEHICLE BODY STRUCTURE

(71) Applicant: HONDA MOTOR CO., LTD., Tokyo (JP)

(72) Inventors: Hirotaka Hayakawa, Tokyo (JP); Tsuyoshi Tanaka, Tokyo (JP); Takafumi Raitoku, Tokyo (JP); Tetsuya Sugizaki, Tokyo (JP); Ryo Shinoda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 512 days.

(21) Appl. No.: 17/949,379

(22) Filed: Sep. 21, 2022

(65) Prior Publication Data

US 2023/0101105 A1 Mar. 30, 2023

(30) Foreign Application Priority Data

Sep. 24, 2021 (JP) ................................ 2021-155759

(51) Int. Cl.
*B60K 1/04* (2019.01)
*B60L 50/60* (2019.01)
*B60L 50/64* (2019.01)
*B62D 25/08* (2006.01)

(52) U.S. Cl.
CPC ............... *B62D 25/08* (2013.01); *B60K 1/04* (2013.01); *B60L 50/64* (2019.02); *B60L 50/66* (2019.02); *B60K 2001/0416* (2013.01)

(58) Field of Classification Search
CPC .. B60L 50/64; B60L 50/66; B60K 2001/0416
See application file for complete search history.

(56) References Cited

U.S. PATENT DOCUMENTS

| | | | | |
|---|---|---|---|---|
| 8,393,426 | B2* | 3/2013 | Takahashi | B60K 1/04 |
| | | | | 180/68.5 |
| 8,708,401 | B2* | 4/2014 | Lee | B62D 21/152 |
| | | | | 280/124.109 |
| 8,881,853 | B2* | 11/2014 | Nitawaki | B60L 50/66 |
| | | | | 180/68.5 |
| 9,120,508 | B2* | 9/2015 | Pohl | B62D 25/2027 |
| 9,517,687 | B2* | 12/2016 | Nakajima | B60K 1/04 |
| 9,758,194 | B2* | 9/2017 | Inagaki | B60K 1/04 |
| 9,975,416 | B2* | 5/2018 | Hara | B62D 25/20 |
| 10,046,633 | B2* | 8/2018 | Shimoda | B60R 16/04 |
| 10,245,955 | B2* | 4/2019 | Nakayama | B60K 1/04 |

(Continued)

FOREIGN PATENT DOCUMENTS

JP 6631472 1/2020

*Primary Examiner* — Katy M Ebner
(74) *Attorney, Agent, or Firm* — Amin, Turocy & Watson, LLP

(57) ABSTRACT

This rear vehicle body structure includes a first floor cross member disposed on a vehicle front side with respect to a battery and connected to a rear side frame extending in a vehicle front-rear direction on an outer side in a vehicle width direction, and a second floor cross member disposed on a vehicle rear side with respect to the battery, in which the first floor cross member includes a widened part widened in the vehicle front-rear direction at an end portion and extending to a position at which it overlaps the battery, and a boundary part between the widened part and the rear side frame is disposed at a position at which it overlaps the battery in a side view.

10 Claims, 13 Drawing Sheets

(56) References Cited

U.S. PATENT DOCUMENTS

| | | | | |
|---|---|---|---|---|
| 10,442,283 B2* | 10/2019 | Kato | ........................ | B60L 50/64 |
| 10,486,515 B2* | 11/2019 | Saeki | ........................ | B60N 2/005 |
| 10,518,621 B2* | 12/2019 | Nitta | ........................ | H01M 50/24 |
| 10,632,847 B2* | 4/2020 | Yokoyama | ............... | B60L 50/66 |
| 10,730,380 B2* | 8/2020 | Tatsuwaki | .............. | B60L 3/0007 |
| 10,737,566 B2* | 8/2020 | Tai | ........................ | B62D 25/08 |
| 11,148,728 B2* | 10/2021 | Saeki | ........................ | B60K 1/04 |
| 2018/0126835 A1* | 5/2018 | Saeki | ........................ | B62D 25/20 |
| 2018/0354438 A1* | 12/2018 | Baccouche | ............ | B60L 3/0046 |
| 2019/0081296 A1* | 3/2019 | Takahashi | ............ | H01M 50/249 |
| 2019/0233013 A1* | 8/2019 | Tai | ........................ | B62D 25/2036 |
| 2021/0213818 A1* | 7/2021 | Furukawa | ............... | B62D 25/08 |
| 2021/0320366 A1* | 10/2021 | Hashimoto | .............. | B60K 1/04 |
| 2022/0314775 A1* | 10/2022 | Mukumoto | ............... | B60K 1/04 |
| 2023/0347726 A1* | 11/2023 | Oishi | ........................ | B60K 1/04 |

\* cited by examiner

REAR VEHICLE BODY STRUCTURE

CROSS-REFERENCE TO RELATED APPLICATION

The present application claims priority based on Japanese Patent Application No. 2021-155759, filed Sep. 24, 2021, the content of which is incorporated herein by reference.

BACKGROUND OF THE INVENTION

Field of the Invention

The present invention relates to a rear vehicle body structure.

Description of Related Art

Among rear vehicle body structures, for example, one in which a power storage device is disposed below a rear seat, the power storage device is surrounded by a framework part of a vehicle body disposed in a lattice shape, and the power storage device is protected by the framework part is known. The framework part of the vehicle body is formed in a lattice shape by left and right rear side frames provided on left and right sides of the power storage device in a vehicle width direction, a first floor cross member provided on a vehicle front side of the power storage device, and a second floor cross member provided on a vehicle rear side of the power storage device.

The first floor cross member and the second floor cross member extend in a vehicle width direction and are bridged between the left and right rear side frames. Therefore, for example, a load input by a lateral collision can be supported by the first floor cross member and the second floor cross member (see, for example, Japanese Patent No. 6631472).

SUMMARY OF THE INVENTION

Here, in the rear vehicle body structure of Japanese Patent No. 6631472, a first floor cross member is provided on a vehicle front side of a power storage device, and a second floor cross member is provided on a vehicle rear side at a distance with respect to the first floor cross member. Therefore, for example, a case in which a load due to a lateral collision is input to a rear side frame between the first floor cross member and the second floor cross member in a vehicle front-rear direction is conceivable. In this case, it is conceivable that the rear side frame will be deformed inward in a vehicle width direction (that is, on the power storage device side), and it is difficult to protect the power storage device from the input load.

As a countermeasure for this, for example, reinforcing the rear side frame with a reinforcing member to protect the power storage device from the input load can be considered. However, reinforcing the rear side frame with a reinforcing member will cause an increase in the number of parts and an increase in size, which will lead to an increase in weight of the vehicle body, and is not preferable from the perspective of reducing a weight of the vehicle body or the like.

An aspect of the present invention is directed to providing a rear vehicle body structure capable of supporting a load input by a lateral collision with a first floor cross member without reinforcing, for example, a rear side frame with a reinforcing member.

In order to achieve the above-described objective, a rear vehicle body structure according to an aspect of the present invention employs the following configuration.

(1) An aspect of the present invention is a rear vehicle body structure (for example, a rear vehicle body structure 10 of an embodiment) including a first floor cross member (for example, a first floor cross member 14 of an embodiment) disposed on a vehicle front side with respect to a battery (for example, a battery 121 or a battery module 121 of the embodiment) and connected to a rear side frame (for example, a rear side frame 13 of the embodiment) extending in a vehicle front-rear direction on an outer side in a vehicle width direction, and a second floor cross member (for example, a second floor cross member 15 of the embodiment) disposed on a vehicle rear side with respect to the battery, in which the first floor cross member includes a widened part (for example, a widened part 14B of the embodiment) widened in the vehicle front-rear direction at an end portion and extending to a position at which it overlaps the battery, and a boundary part (for example, a boundary part 88 of the embodiment) between the widened part and the rear side frame is disposed at a position at which it overlaps the battery in a side view.

According to the aspect (1) described above, the boundary part between the widened part of the first floor cross member and the rear side frame is disposed at a position at which it overlaps the battery in a side view. Therefore, for example, a load (hereinafter also referred to as a lateral collision load) input from an outside of the battery in the vehicle width direction by a lateral collision can be received at the boundary part. Thereby, the lateral collision load can be efficiently transmitted from the boundary part to a center side of the first floor cross member in the vehicle width direction, and the lateral collision load can be supported by the first floor cross member.

Therefore, an amount of deformation of a vehicle body lateral portion (for example, the widened part, the rear side frame, and the like) positioned on an outer side of the battery in the vehicle width direction can be reduced, and damage to (deformation of) the battery can be minimized to protect the battery.

When the boundary part between the widened part and the rear side frame is disposed at a position at which it overlaps the battery, the lateral collision load can be supported by the first floor cross member without reinforcing, for example, the rear side frame with a reinforcing member. Therefore, weight reduction of the vehicle body can be achieved.

Here, for example, when an excessive lateral collision load is input by a lateral collision, it is conceivable that the widened part (that is, the first floor cross member) will bend to a side of the rear side frame. On the other hand, the widened part is in contact with the rear side frame because the boundary part with the rear side frame is formed. Therefore, for example, when the excessive lateral collision load is input by a lateral collision, the widened part can be supported by the rear side frame so that bending (collapse) of the widened part is suppressed.

Thereby, the widened part being bent to a side of the rear side frame (that is, a side of the battery) by the excessive lateral collision load can be suppressed by the rear side frame, and the excessive lateral collision load can be transmitted to the center side of the first floor cross member. Also, when the collapse of the widened part is suppressed, the widened part can be suitably deformed by the excessive lateral collision load to absorb impact energy due to the excessive lateral collision load. Therefore, even for the excessive lateral collision load, damage to (deformation of) the battery can be minimized to protect the battery.

(2) In the aspect (1) described above, the widened part may include an inclined surface (for example, an inclined wall 52 of the embodiment) inclined upward toward the rear of the vehicle on a front surface positioned on a vehicle front side.

According to the aspect (2) described above, the inclined surface is formed on the front surface of the widened part. Therefore, a ridge line formed in a V shape at an intersecting portion of the inclined surface and another surface and extending substantially in the vehicle width direction can be formed on, for example, the front surface of the widened part. Thereby, a ridge line of the first floor cross member can be increased. Therefore, the lateral collision load input to an end portion (that is, the widened part) of the first floor cross member can be efficiently transmitted to a center side of the first floor cross member.

Also, the lateral collision load can also be transmitted to the front floor panel provided on a vehicle front side of the first floor cross member.

Here, for example, the end portion (the widened part) of the first floor cross member is positioned at a rear lower portion of an opening for a rear side door. Therefore, when the inclined surface is formed on the front surface of the widened part, a large foot space can be secured on an outer side of the passenger compartment in the vehicle width direction. Thereby, it is possible to make boarding easier for an occupant when the occupant gets in and out of the passenger compartment.

(3) In the aspect (2) described above, the first floor cross member may include a ridge line (for example, a first ridge line 92 of the embodiment) formed at an intersecting portion of the front surface and a top part (for example, an upper top part 61 of the embodiment) formed from the front surface toward the rear of the vehicle, the ridge line may include a first outer ridge line (for example, a first outer ridge line 95 of the embodiment) formed at an intersecting portion of the inclined surface and the top part, and a first center-side ridge line (for example, a first center-side ridge line 96 of the embodiment) formed at an intersecting portion of a portion (for example, a center-side front wall 54 of the embodiment) of the front surface on an inner side of the inclined surface in the vehicle width direction and the top part, and the first outer ridge line may be offset toward the rear of the vehicle with respect to the first center-side ridge line.

According to the aspect (3) described above, in the ridge line of the first floor cross member, the first outer ridge line on the inclined surface side (the widened part side) is offset toward the rear of the vehicle with respect to the first center-side ridge line on a center side in the vehicle width direction. Therefore, the first outer ridge line can be brought closer to the battery side in the vehicle front-rear direction. Thereby, for example, the lateral collision load input from the outside of the battery in the vehicle width direction by a lateral collision can be received by the first outer ridge line and efficiently transmitted to the first center-side ridge line. That is, the lateral collision load can be efficiently transmitted to the first floor cross member.

(4) In the aspect (3) described above, the first outer ridge line may start to be offset toward the rear of the vehicle with respect to the first center-side ridge line from a battery outer end portion (for example, a battery outer end portion 121*a* of the embodiment) of the battery on an outer side in the vehicle width direction, and the first floor cross member may include another ridge line (for example, a second ridge line 93 of the embodiment) formed at a portion of the front surface in which the inclined surface and another surface (for example, an outer front wall 53 of the embodiment) below the inclined surface intersect, and positioned on a lower side of the first outer ridge line.

According to the aspect (4) described above, another ridge line is formed on a lower side of the first outer ridge line in the ridge line. Therefore, for example, the lateral collision load input from the outside of the battery in the vehicle width direction by a lateral collision can be received by the first outer ridge line and another ridge line. Thereby, the lateral collision load can be more efficiently transmitted to the first floor cross member.

(5) In the aspect (3) described above, the widened part may be set to have a largest vehicle front-rear direction width (for example, a vehicle front-rear direction width W1 of the embodiment) at a portion (for example, a maximum widened part 14C of the embodiment) at which it overlaps the rear side frame in the vehicle width direction.

According to the aspect (5) described above, the vehicle front-rear direction width is set to be the largest in a portion of the widened part overlapping the rear side frame. Therefore, for example, the widened part can be brought into contact with or closer to the rear side frame in the vehicle front-rear direction. Thereby, bending (collapsing) of the widened part to a side of the rear side frame due to the lateral collision load can be suppressed by the rear side frame. Therefore, the lateral collision load can be efficiently transmitted to the first floor cross member, and the lateral collision load can be supported by the first floor cross member.

Further, for example, even when an excessive lateral collision load is input by a lateral collision, collapsing of the widened part to a side of the rear side frame due to the lateral collision load can be suppressed by the rear side frame. Therefore, the excessive lateral collision load can be efficiently transmitted to the first floor cross member. Also, when the collapse of the widened part is suppressed, the widened part (particularly, a portion in which the vehicle front-rear direction width is set to be the largest) can be suitably deformed by the excessive lateral collision load to absorb impact energy due to the excessive lateral collision load.

(6) The aspect (2) described above may further include a housing part (for example, a battery housing part 16 of the embodiment) surrounded by the first floor cross member, the second floor cross member, and the rear side frame to dispose the battery therein, in which the housing part may include a side wall (for example, a housing side wall 119 of the embodiment) connected from an end portion (for example, a left outer end portion 114*a* of a housing rear end portion of the embodiment) of the second floor cross member to the widened part.

According to the aspect (6) described above, the housing part surrounded by the first floor cross member, the second floor cross member, and the rear side frame is provided. The battery is disposed in the housing part, and the side wall of the housing part is connected to the widened part from the end portion of second floor cross member. Therefore, for example, the lateral collision load input to a side of the widened part can be transmitted to the first floor cross member and can be transmitted to the second floor cross member through the side wall of the housing part.

That is, the lateral collision load can be efficiently transmitted to the first floor cross member and the second floor cross member. Thereby, the lateral collision load can be supported by the first floor cross member and the second floor cross member. Therefore, an amount of deformation of the vehicle body lateral portion (for example, the widened part, the rear side frame, and the like) positioned on an outer side of the battery in the vehicle width direction can be reduced, and thereby damage to (deformation of) the battery can be minimized to protect the battery.

(7) In the aspect (1) described above, the first floor cross member may be formed so that a height (for example, a height H of the embodiment) increases toward an upper side of the vehicle toward an outer side in the vehicle width direction, and the widened part is set to be the highest.

According to the aspect (7) described above, the widened part is set to be the highest in the first floor cross member. Therefore, strength and rigidity can be enhanced by securing a large cross-sectional area of the widened part. Thereby, the widened part can be suitably deformed by the lateral collision load to absorb impact energy due to the lateral collision load. Therefore, damage to (deformation of) the battery due to the lateral collision load can be minimized to protect the battery.

Also, the first floor cross member is formed so that the height increases toward an upper side of the vehicle toward an outer side in the vehicle width direction. Therefore, the height of a central part of the first floor cross member on an inner side of the widened part in the vehicle width direction can be suppressed to be lower than that of the widened part. Thereby, a space for passing wirings of the battery can be secured in the central part of the first floor cross member.

(8) The aspect (5) described above may further include a battery cover (for example, a battery cover 18 of the embodiment) made of a metal connected to the first floor cross member and the second floor cross member and covering an upper portion of the battery, in which the battery cover may include a vehicle width outer connection part (for example, left and right vehicle width outer connection parts 134 of the embodiment) connected to a cover outer end portion on an outer side in the vehicle width direction across the inclined surface in the vehicle front-rear direction, and the vehicle width outer connection part may include a rear fixing part (for example, a rear fixing part 137 of the embodiment) connected to the rear side frame and a front fixing part (for example, a front fixing part 136 of the embodiment) connected to a portion below the inclined surface on the front surface of the first floor cross member positioned on a vehicle front side.

According to the aspect (8) described above, the battery cover made of a metal covering the upper portion of the battery is connected to the first floor cross member and the second floor cross member. Also, the vehicle width outer connection part of the battery cover is connected across the inclined surface. When the battery cover is made of a metal, strength and rigidity of the battery cover can be enhanced. Therefore, the inclined surface of the widened part can be reinforced with the vehicle width outer connection part having high strength and rigidity to enhance strength and rigidity of the inclined surface (that is, the first floor cross member).

Thereby, the lateral collision load can be transmitted to the metal battery cover through the widened part and the vehicle width outer connection part, and the lateral collision load can be supported by the battery cover. Therefore, deformation of the first floor cross member due to the lateral collision load can be suppressed, and thereby damage to (deformation of) the battery can be minimized to protect the battery.

Also, the rear fixing part of the vehicle width outer connection part of the battery cover is connected to the rear side frame. The rear side frame is connected to the second floor cross member. Therefore, the first floor cross member, the rear side frame, and the second floor cross member can be connected by the battery cover. Thereby, the lateral collision load can be transmitted to peripheral members of the battery constituted by the first floor cross member, the rear side frame, the second floor cross member, and the battery cover. Therefore, the strength and rigidity of the peripheral members of the battery with respect to the lateral collision load can be enhanced, and thereby damage to (deformation of) the battery can be minimized to protect the battery.

(9) In the aspect (8) described above, the first floor cross member may include a first floor cross member upper (for example, a first upper member 36 of the embodiment) formed by the front surface and the top part, and a first floor cross member lower (for example, a first lower member 37 of the embodiment) connected to the first floor cross member upper, the rear side frame may include a rear side frame upper (for example, a rear side frame upper 28 of the embodiment) which closes an opening of an upper portion, and the rear fixing part may be connected to a position at which the rear side frame upper, the first floor cross member upper, and the first floor cross member lower overlap in a vertical direction.

According to the aspect (9) described above, the rear fixing part of the battery cover is connected to a position at which the rear side frame upper, the first floor cross member upper, and the first floor cross member lower overlap each other. Therefore, four members of the rear fixing part, the rear side frame upper, the first floor cross member upper, and the first floor cross member lower can overlap and be connected. Thereby, strength and rigidity of the connection part in which the four members overlap and are connected can be enhanced, and transmission efficiency of the lateral collision load can be improved.

Therefore, the lateral collision load can be efficiently transmitted to the four members of the rear fixing part (that is, the battery cover), the rear side frame upper, the first floor cross member upper, and the first floor cross member lower. Thereby, damage to (deformation of) the battery can be minimized to protect the battery.

Also, the four members of the rear fixing part, the rear side frame upper, the first floor cross member upper, and the first floor cross member lower overlap and are connected, and thereby the strength and rigidity of the connection part of the four members are enhanced. Thereby, for example, a load input from a rear seat disposed on an upper portion of the battery cover can be supported by the connection part of the four members, and ride comfort of an occupant seated on the seat can be improved.

(10) In the aspect (9) described above, the first floor cross member upper may include an upper main body (for example, an upper main body 41 of the embodiment) forming a main part of the first floor cross member upper, and a stiffener (for example, a stiffener 42 of the embodiment) connected to an end portion of the upper main body on an outer side in the vehicle width direction and forming an end portion upper surface of the first floor cross member upper, and the stiffener may be set to have higher rigidity than the upper main body, and an inner end portion (for example, an inner end portion 42b of the embodiment) thereof on an inner side in the vehicle width direction may extend inward in the vehicle width direction from a cross member end portion on an outer side of the first floor cross member in the vehicle width direction with respect to the widened part.

According to the aspect (10) described above, the end portion upper surface of the first floor cross member upper is formed by the stiffener that is separate from the upper main body. Further, strength and rigidity of the stiffener are set higher than those of the upper main body. In addition, the inner end portion of the stiffener extends inward in the vehicle width direction with respect to the widened part. Therefore, the end portion upper surface of the first floor cross member upper can be set to have high strength and rigidity due to the stiffener. The end portion upper surface of the first floor cross member upper is a portion included in the widened part. Thereby, strength and rigidity of the widened part 14B can be set high.

Also, the end portion upper surface of the first floor cross member upper is connected to overlap three members of the rear fixing part of the battery cover, the rear side frame upper, and the first floor cross member lower, and forms the connection part together with the three members. Thereby, the strength and rigidity of the connection part due to the four members can be enhanced, and connection rigidity between the rear side frame and the battery cover can be enhanced.

In this way, when the strength and rigidity of the widened part are set to be high, and furthermore the connection rigidity between the rear side frame and the battery cover is enhanced, protection performance of the battery with respect to, for example, a lateral collision load can be enhanced.

Further, the end portion upper surface of the first floor cross member upper is formed by the stiffener that is separate from the upper main body. Therefore, for example, when another stiffener corresponding to another model is selected, the upper main body can be shared with another model. Thereby, when the stiffener is selected to correspond to another model, the upper main body and the first floor cross member lower constituting the main part of the first floor cross member can be shared by another model.

According to an aspect of the present invention, a load input by a lateral collision can be supported by a first floor cross member without reinforcing, for example, a rear side frame with a reinforcing member.

DESCRIPTION OF EMBODIMENTS

Figure 1:
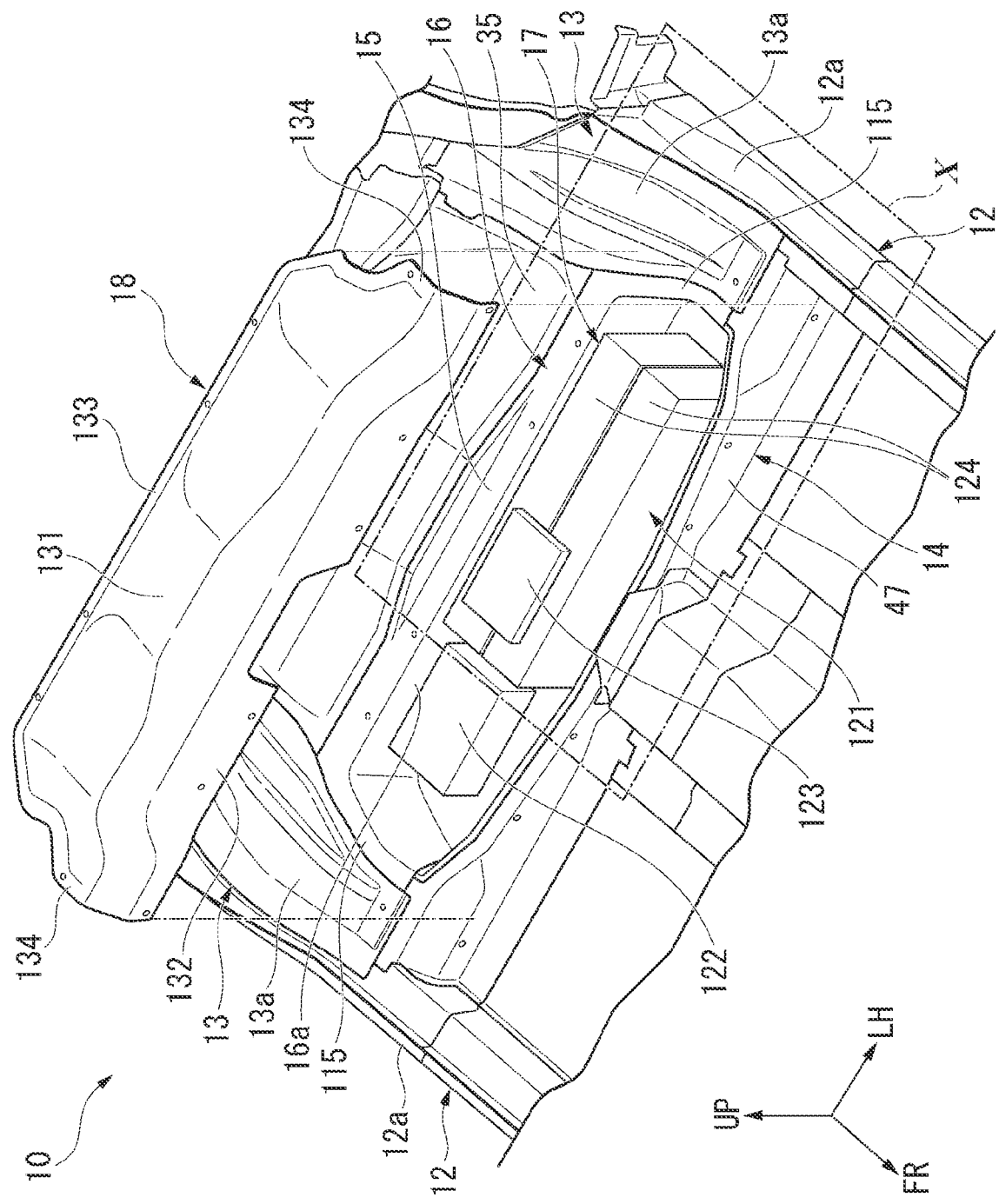
FIG. 1 is an exploded perspective view in which a battery cover is disassembled from a rear vehicle body structure according to an embodiment of the present invention.

Hereinafter, a rear vehicle body structure of an embodiment of the present invention will be described on the basis of the drawings. In the drawings, an arrow FR indicates toward the front of a vehicle, an arrow UP indicates toward the top of the vehicle, and an arrow LH indicates toward the left of the vehicle. In the embodiment, as an example, a case in which the rear vehicle body structure is applied to an electric vehicle such as a hybrid vehicle including an electric motor for traveling will be described. However, it is not limited thereto, and the rear vehicle body structure can also be applied to various other automobiles.

Further, the rear vehicle body structure has a configuration that is substantially bilaterally symmetrical, constituent members on a left side and constituent members on a right side are denoted by the same reference signs, and detailed description of the constituent members on the right side will be omitted.

<Rear Vehicle Body Structure>

Figure 2:
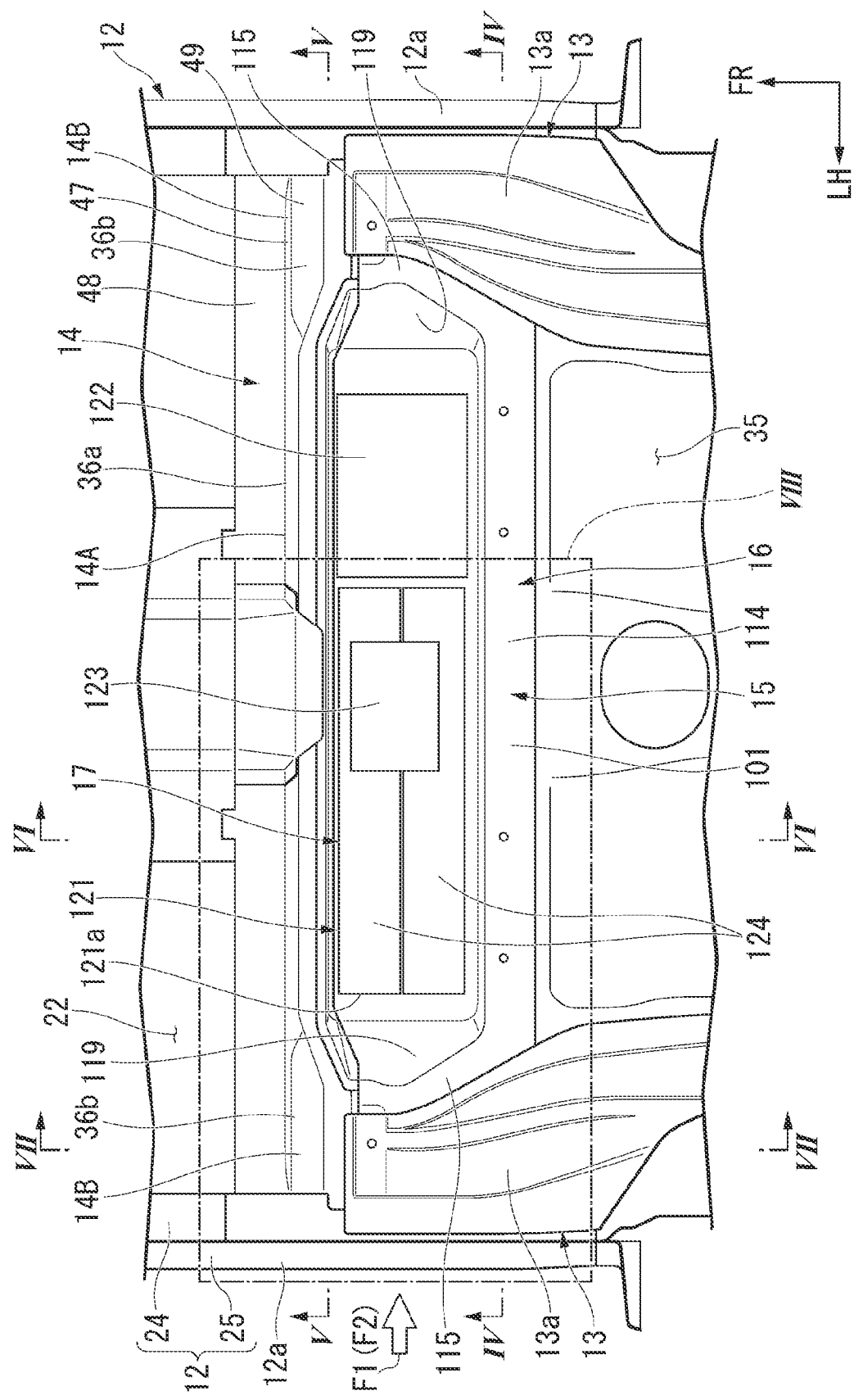
FIG. 2 is a plan view of the rear vehicle body structure according to the embodiment of the present invention.
Figure 3:
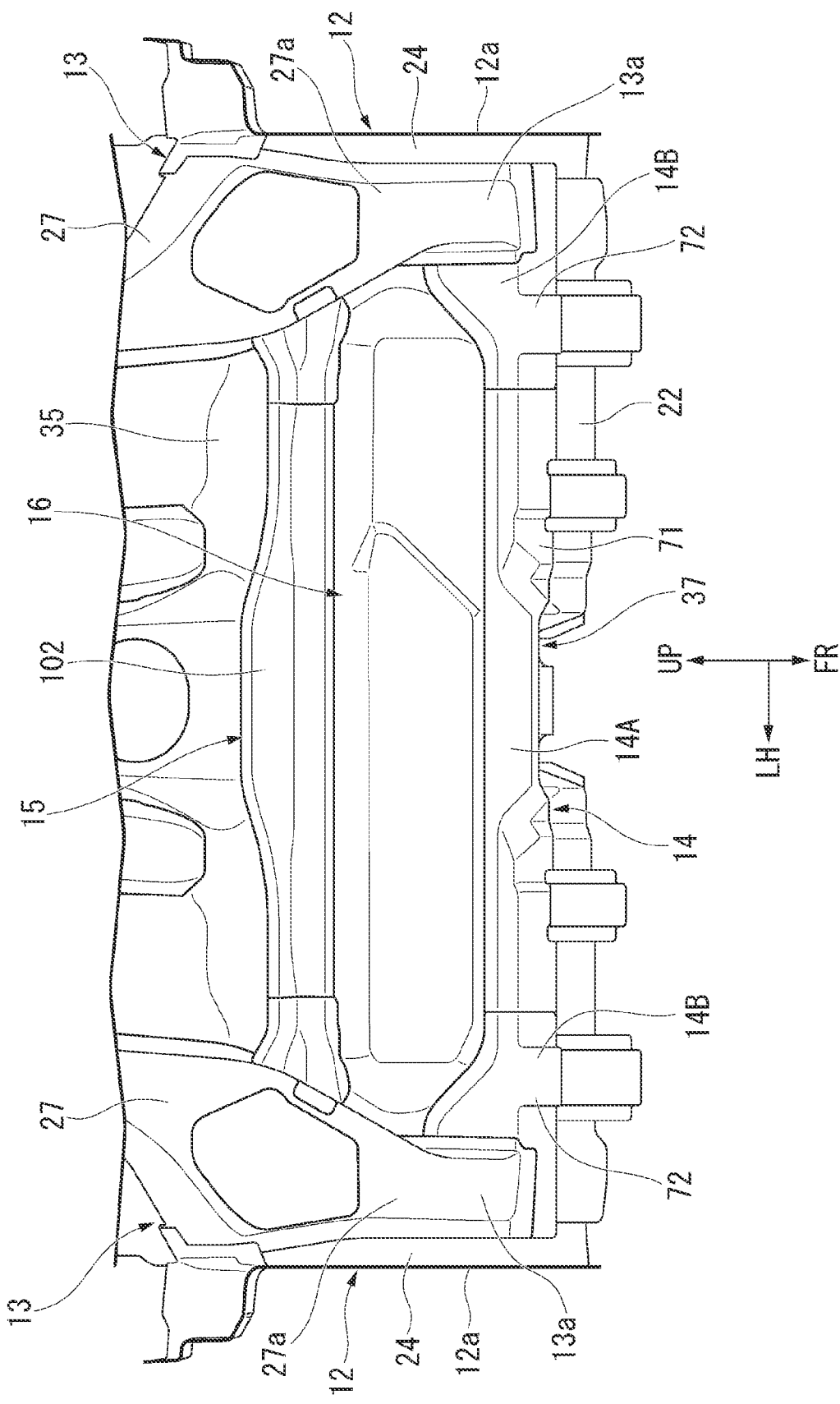
FIG. 3 is a rear view of the rear vehicle body structure of the embodiment of the present invention from below at the rear of a vehicle.

As illustrated in FIGS. 1 to 3, a rear vehicle body structure 10 includes, for example, left and right side sills 12, left and right rear side frames 13 disposed on an inner side of the side sills 12 in a vehicle width direction, a first floor cross member (front cross member) 14 disposed on a vehicle front side of the rear side frames 13, a second floor cross member (rear cross member) 15 disposed on a vehicle rear side with respect to the first floor cross member 14, and a battery housing part (housing part) 16, a power storage device 17, and a battery cover 18 disposed between the first floor cross member 14 and the second floor cross member 15 and on an inner side of the rear side frames 13 in the vehicle width direction.

Hereinafter, the left side sill 12 may be abbreviated as "side sill 12," and the left rear side frame 13 may be abbreviated as "rear side frame 13."

<Side Sill>

Figure 4:
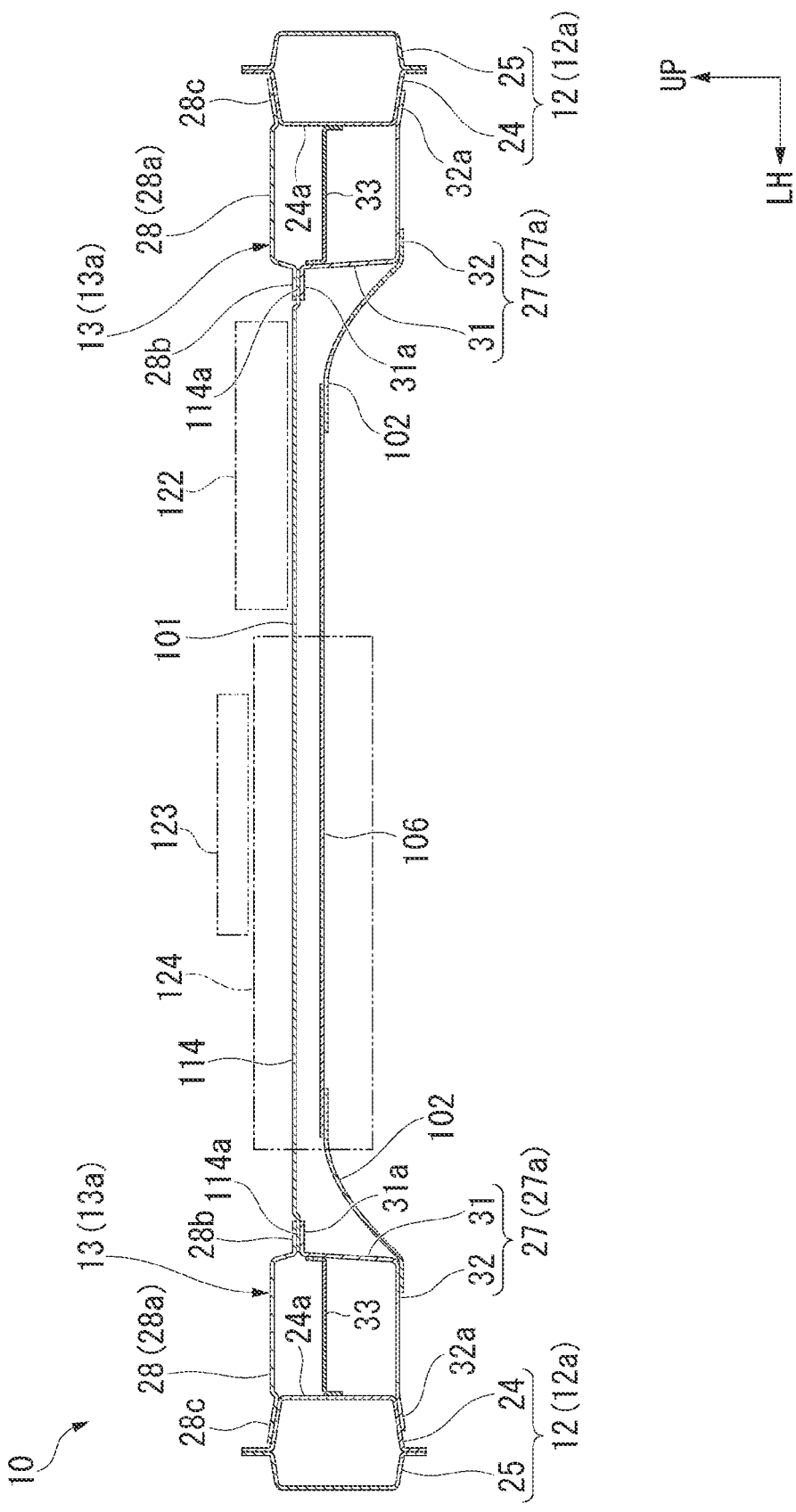
FIG. 4 is a cross-sectional view cut along line IV-IV of FIG. 2.

As illustrated in FIGS. 1, 3, and 4, for example, the side sill 12 extends in a vehicle front-rear direction on an outer side of a front floor panel 22 in the vehicle width direction. The side sill 12 is a member formed in a rectangular closed cross section by, for example, an inner side sill 24 and an outer side sill 25, and having high strength and rigidity constituting a framework of the vehicle body.

The front floor panel 22 is provided between the left side sill 12 and the right side sill 12. The front floor panel 22 has a rear end portion connected to the first floor cross member 14 to be described later, and is provided on a vehicle front side with respect to the first floor cross member 14. The front floor panel 22 forms a floor surface of a passenger compartment.

The rear side frame 13 is connected to a rear end portion 12a of the side sill 12.

<Rear Side Frame>

A front end portion 13a of the rear side frame 13 is connected to the rear end portion 12a of the side sill 12 from an inner side in the vehicle width direction. Hereinafter, the front end portion 13a of the rear side frame 13 may also be referred to as a "frame front end portion 13a." The rear side frame 13 is provided on an outer side in the vehicle width direction with respect to the battery housing part 16 and the second floor cross member 15, and extends toward the rear of the vehicle from the rear end portion 12a of the side sill 12. The rear side frame 13 includes a rear side frame lower 27, and a rear side frame upper 28 disposed above the rear side frame lower 27. The rear side frame lower 27 includes a lower frame front end portion 27a and a lower frame main body part (not illustrated).

The lower frame front end portion 27a is connected to the rear end portion 12a of the side sill 12 from an inner side in the vehicle width direction. The lower frame front end portion 27a is disposed on an inner side of the rear end portion 12a of the side sill 12 in the vehicle width direction, and includes a lower inner wall 31 and a lower bottom portion 32 formed in an L-shaped cross section. An upper flange 31a of the lower inner wall 31 is connected to a left housing end portion 115 (to be described later) of the battery housing part 16 and a rear floor panel 35 from below.

The rear floor panel 35 is provided between the left rear side frame 13 and the right rear side frame 13. The rear floor panel 35 is connected to the second floor cross member 15 to be described later, and is provided on a vehicle rear side with respect to the second floor cross member 15. The rear floor panel 35 forms, for example, a floor surface of a luggage compartment.

An outer flange 32a of the lower bottom portion 32 is connected to a bottom portion of the inner side sill 24 from below. Therefore, the lower frame front end portion 27a (that is, the lower inner wall 31 and the lower bottom portion 32) is formed in a U-shaped cross section in which an upper portion opens together with an inner side wall 24a of the inner side sill 24. Also, the lower frame front end portion 27a is reinforced by a lower stiffener 33.

Further, a lower frame main body part (not illustrated) is formed to have a U-shaped cross section with an open upper portion.

That is, the rear side frame lower 27 formed by the lower frame front end portion 27a and the lower frame main body part is formed to have a U-shaped cross section with the open upper portion. The opening of the upper portion of the rear side frame lower 27 is closed by the rear side frame upper 28.

Specifically, in the rear side frame upper 28, an inner flange 28b (see also FIG. 8) of an upper frame front end portion 28a is connected to the left housing end portion 115 (to be described later) of the battery housing part 16 and the rear floor panel 35 from above. Also, in the rear side frame upper 28, an outer flange 28c (see also FIG. 8) of the upper frame front end portion 28a is connected to a top part of the inner side sill 24 from above. As a result, the upper opening having a U-shaped cross section formed by the lower frame front end portion 27a and the inner side wall 24a of the inner side sill 24 is closed by the upper frame front end portion 28a.

Thereby, a closed cross section with a rectangular cross section is formed by the lower frame front end portion 27a, the inner side wall 24a of the inner side sill 24, and the upper frame front end portion 28a. The lower frame front end portion 27a and the upper frame front end portion 28a form the frame front end portion 13a of the rear side frame 13. That is, in the rear side frame 13, the frame front end portion 13a is formed in a closed cross section having a rectangular cross section together with the inner side wall 24a of the inner side sill 24. The upper frame front end portion 28a is connected to the first floor cross member 14 from above (see FIG. 7).

Further, the rear side frame upper 28 includes an upper frame main body part (not illustrated) extending toward the rear of the vehicle from a rear end portion of the upper frame front end portion 28a. The upper frame main body part closes an upper opening of the lower frame main body part (not illustrated). Thereby, a closed cross section with a rectangular cross section is formed by the lower frame main body part and the upper frame main body part. The lower frame main body part and the upper frame main body part form a frame main body part of the rear side frame 13. That is, the frame main body part of the rear side frame 13 is formed in a closed cross section having a rectangular cross section.

The closed cross section formed in the frame main body part (not illustrated) communicates with the closed cross section formed by the lower frame front end portion 27a and the inner side wall 24a of the inner side sill 24. That is, the rear side frame 13 is a member formed in a rectangular closed cross section extending in the vehicle front-rear direction and having high strength and rigidity constituting a framework of the vehicle body.

<First Floor Cross Member>

Figure 5:
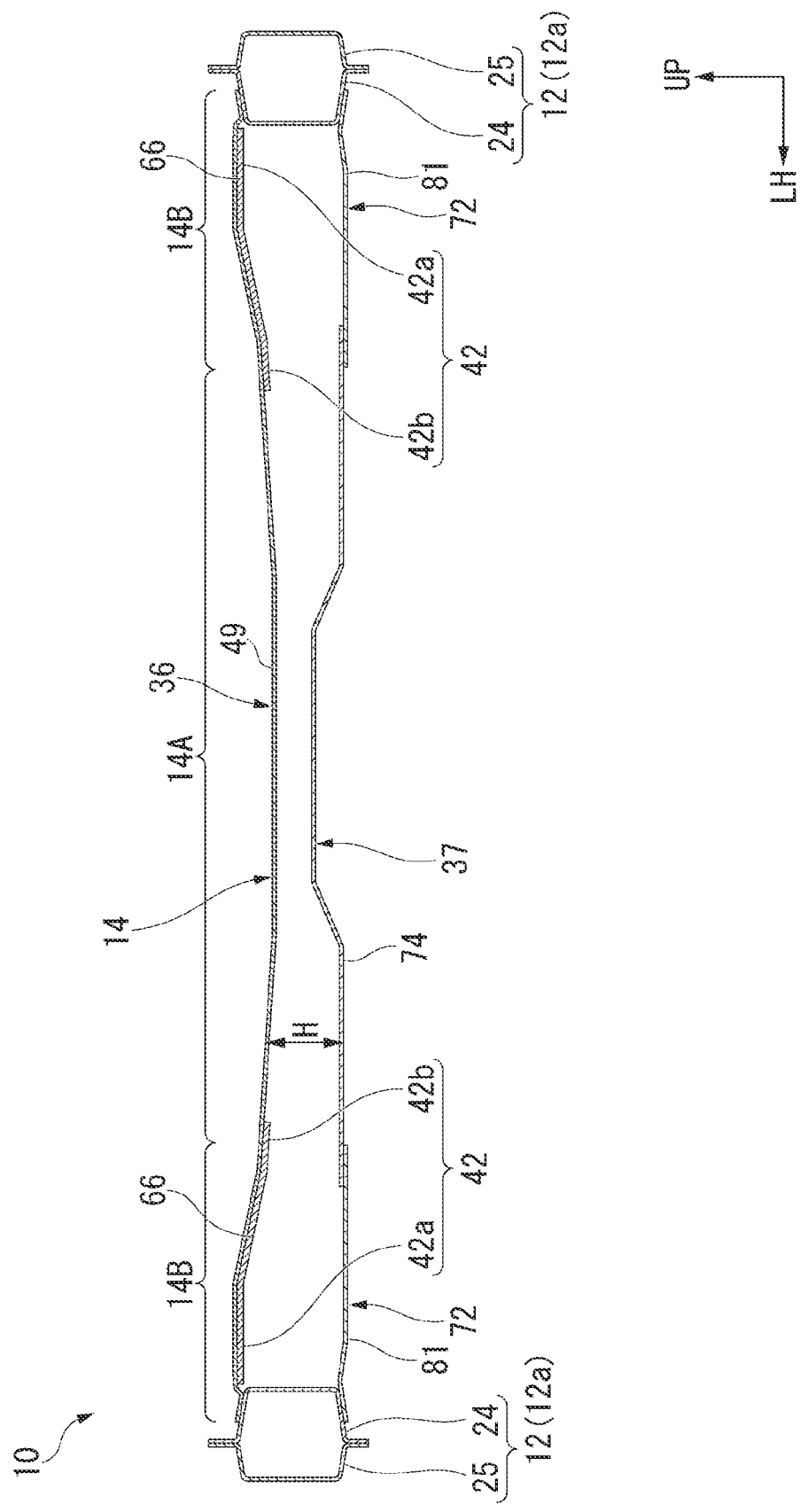
FIG. 5 is a cross-sectional view cut along line V-V of FIG. 2.

As illustrated in FIGS. 3 and 5, the first floor cross member 14 is connected to the frame front end portion 13a of the left rear side frame 13 and the frame front end portion 13a of the right rear side frame 13. The first floor cross member 14 extends in the vehicle width direction and is bridged by being connected in a state of being in contact with the rear end portion 12a of the left side sill 12 and the rear end portion 12a of the right side sill 12. Also, the first floor cross member 14 is disposed on a vehicle front side with respect to the battery housing part 16 and the power storage device 17 (see FIG. 2).

Figure 6:
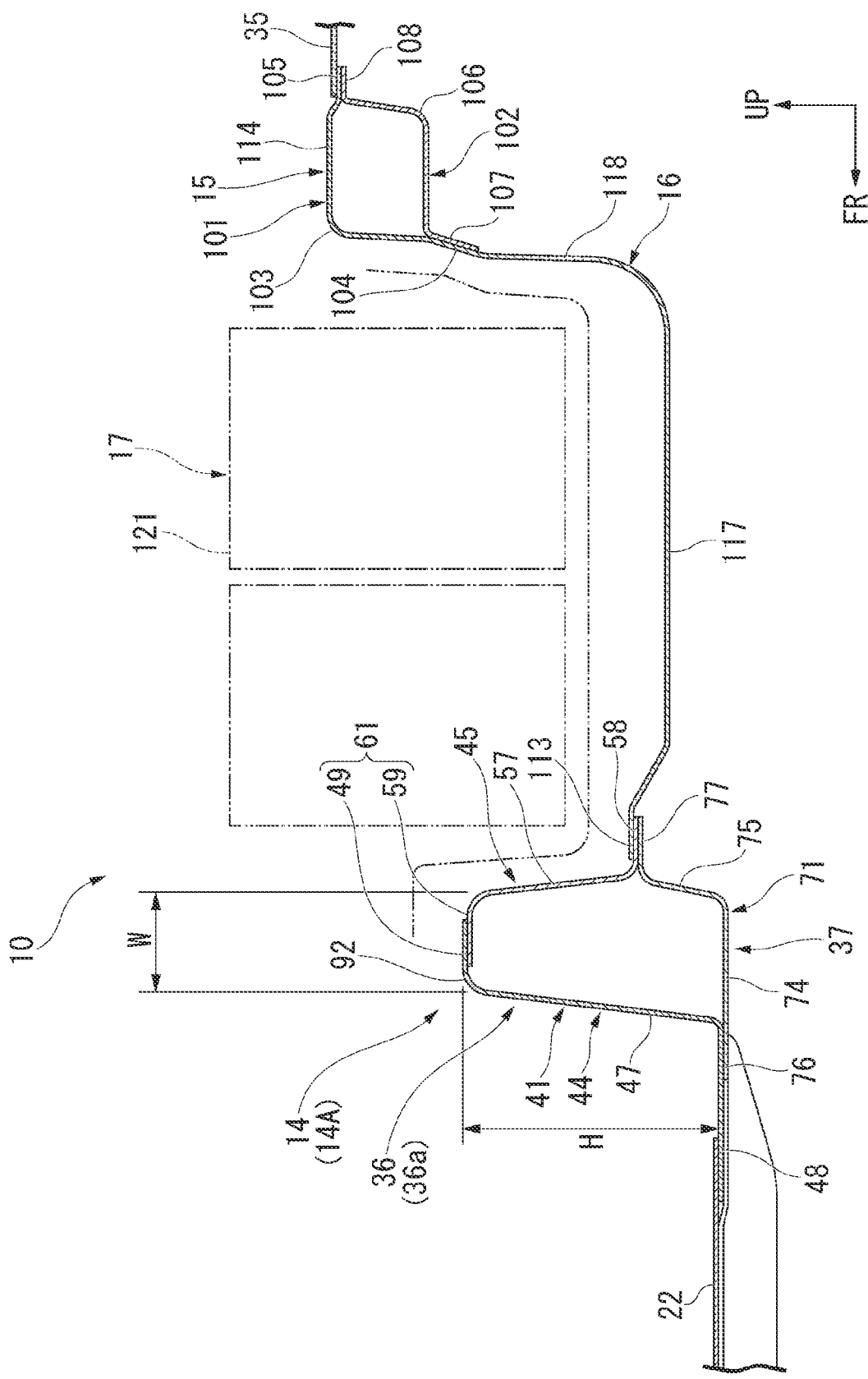
FIG. 6 is a cross-sectional view cut along line VI-VI of FIG. 2.
Figure 7:
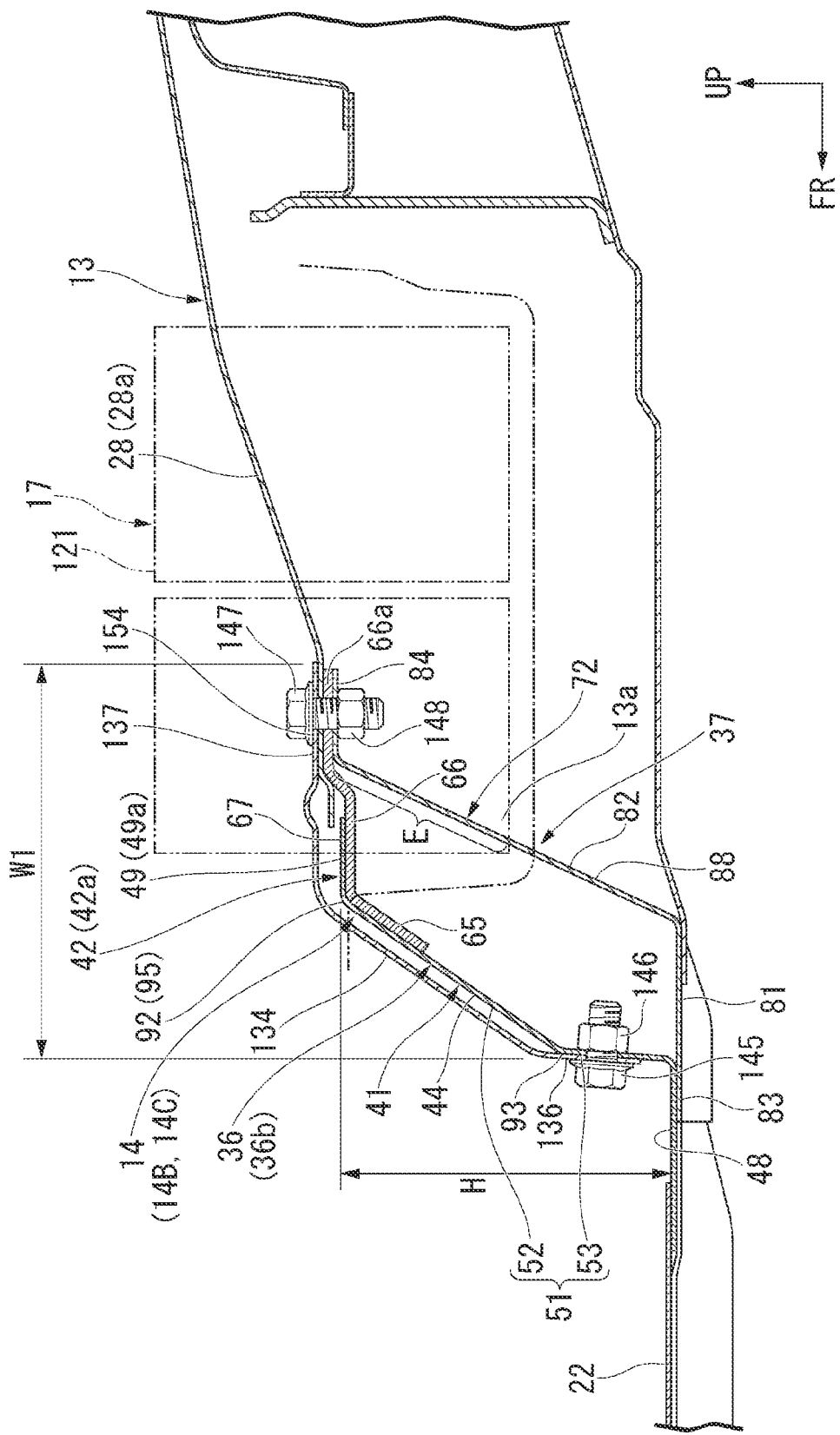
FIG. 7 is a cross-sectional view cut along line VII-VII of FIG. 2.

As illustrated in FIGS. 3, 6, and 7, the first floor cross member 14 includes a first upper member (first floor cross member upper) 36 and a first lower member (first floor cross member lower) 37 disposed below the first upper member 36. The first upper member 36 forms an upper portion of the first floor cross member 14. The first lower member 37 is connected to the first upper member 36 to form a lower portion of the first floor cross member 14.

<First Upper Member>

The first upper member 36 includes an upper main body 41 and a stiffener 42 (see also FIG. 9) provided on an outer side of the upper main body 41 in the vehicle width direction. The upper main body 41 forms a main part of the first upper member 36. The upper main body 41 includes a first upper main body part 44 and a second upper main body part 45 provided on a vehicle rear side of the first upper main body part 44. The first upper main body part 44 includes an upper front wall (front surface) 47, a first upper flange 48 provided at a lower portion of the upper front wall 47, and a first top flange 49 provided at an upper portion of the upper front wall 47.

The upper front wall 47 is raised upward with respect to the front floor panel 22. Also, the upper front wall 47 extends in the vehicle width direction and is bridged between the rear end portion 12a of the left side sill 12 and the rear end portion 12a of the right side sill 12 (see FIG. 2).

The first upper flange 48 is formed from a lower side of the upper front wall 47 toward the front of the vehicle, and is connected to the front floor panel 22 from below. The first top flange 49 is formed from an upper side of the upper front wall 47 toward the rear of the vehicle.

That is, the first upper main body part 44 is formed to have a crank-shaped cross section by the upper front wall 47, the first upper flange 48, and the first top flange 49.

Figure 8:
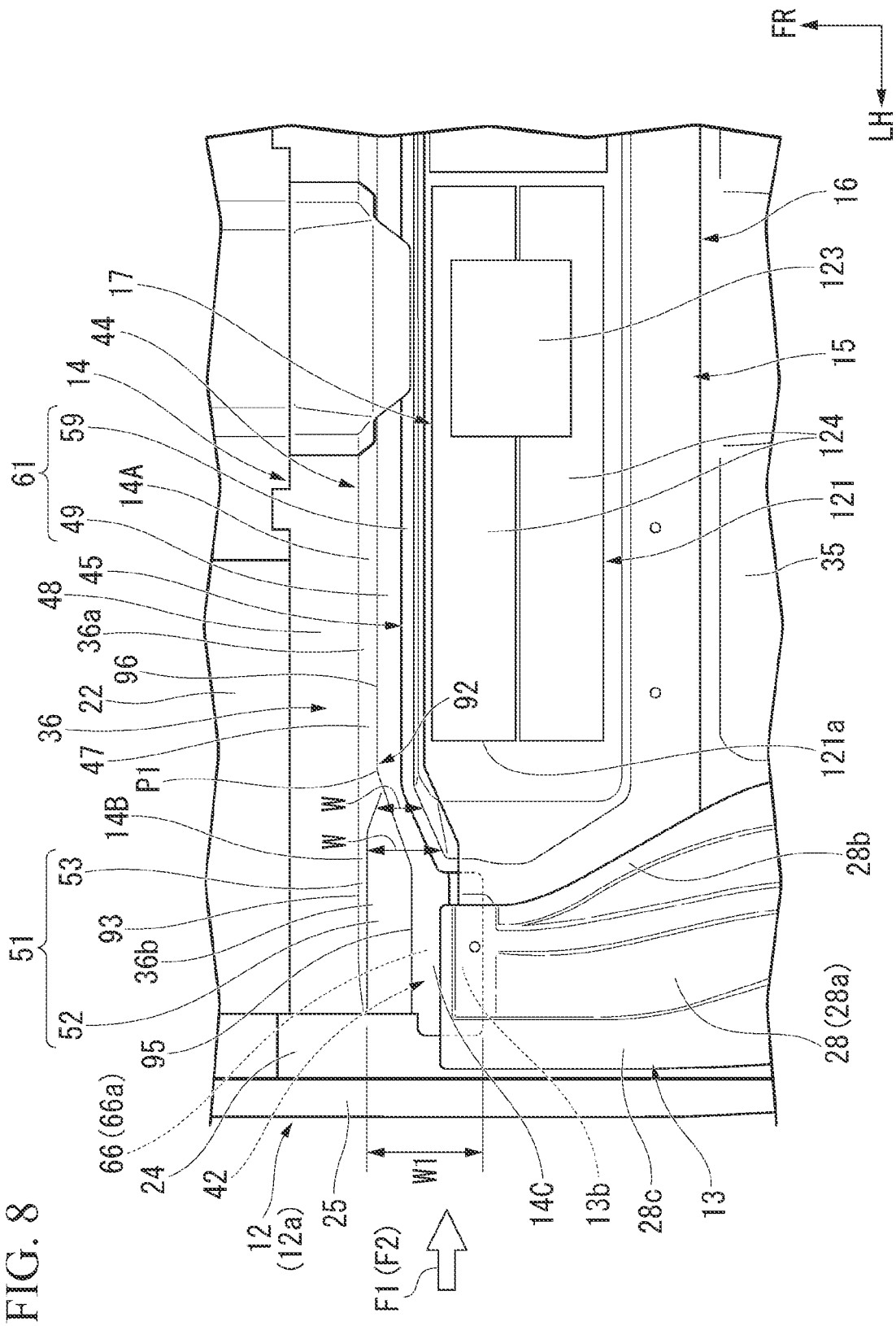
FIG. 8 is an enlarged plan view of the VIII portion of FIG. 2.

As illustrated in FIGS. 7 and 8, the upper front wall 47 includes an upper front wall outer end portion 51 at a left outer end portion and a right outer end portion in the vehicle width direction. The upper front wall outer end portion 51 includes an inclined wall (inclined surface) 52 and a portion below the inclined wall 52 (another surface below the inclined surface) 53. Hereinafter, the portion 53 of the upper front wall 47 below the inclined wall 52 may be referred to as an "outer front wall 53." The inclined wall 52 is inclined upward from an upper side of the outer front wall 53 toward the rear of the vehicle.

As illustrated in FIGS. 6 and 8, the second upper main body part 45 is provided along the first upper main body part 44 on a vehicle rear side of the first upper main body part 44. The second upper main body part 45 includes an upper rear wall 57, a second upper flange 58 provided at a lower portion of the upper rear wall 57, and a second top flange 59 provided at an upper portion of the upper rear wall 57.

The upper rear wall 57 is disposed on a vehicle rear side from the upper front wall 47 with a distance therebetween. The upper rear wall 57 extends in the vehicle width direction and is connected to extension parts 72 (to be described later in FIGS. 3 and 7) on a left outer side in the vehicle width direction and a right outer side in the vehicle width direction.

The second upper flange 58 is formed from a lower side of the upper rear wall 57 toward the rear of the vehicle. The second top flange 59 is formed from the upper side of the upper rear wall 57 toward the front of the vehicle.

That is, the second upper main body part 45 is formed to have a crank-shaped cross section by the upper rear wall 57, the second upper flange 58, and the second top flange 59.

In the second upper main body part 45, the second top flange 59 is connected to the first top flange 49 from below. As a result, an upper top part (top part) 61 of the upper main body 41 is formed by the first top flange 49 and the second top flange 59.

That is, the upper main body 41 is formed in a substantially hat-shaped cross section by the upper front wall 47, the upper rear wall 57, the upper top part 61, the first upper flange 48, and the second upper flange 58.

Figure 9:
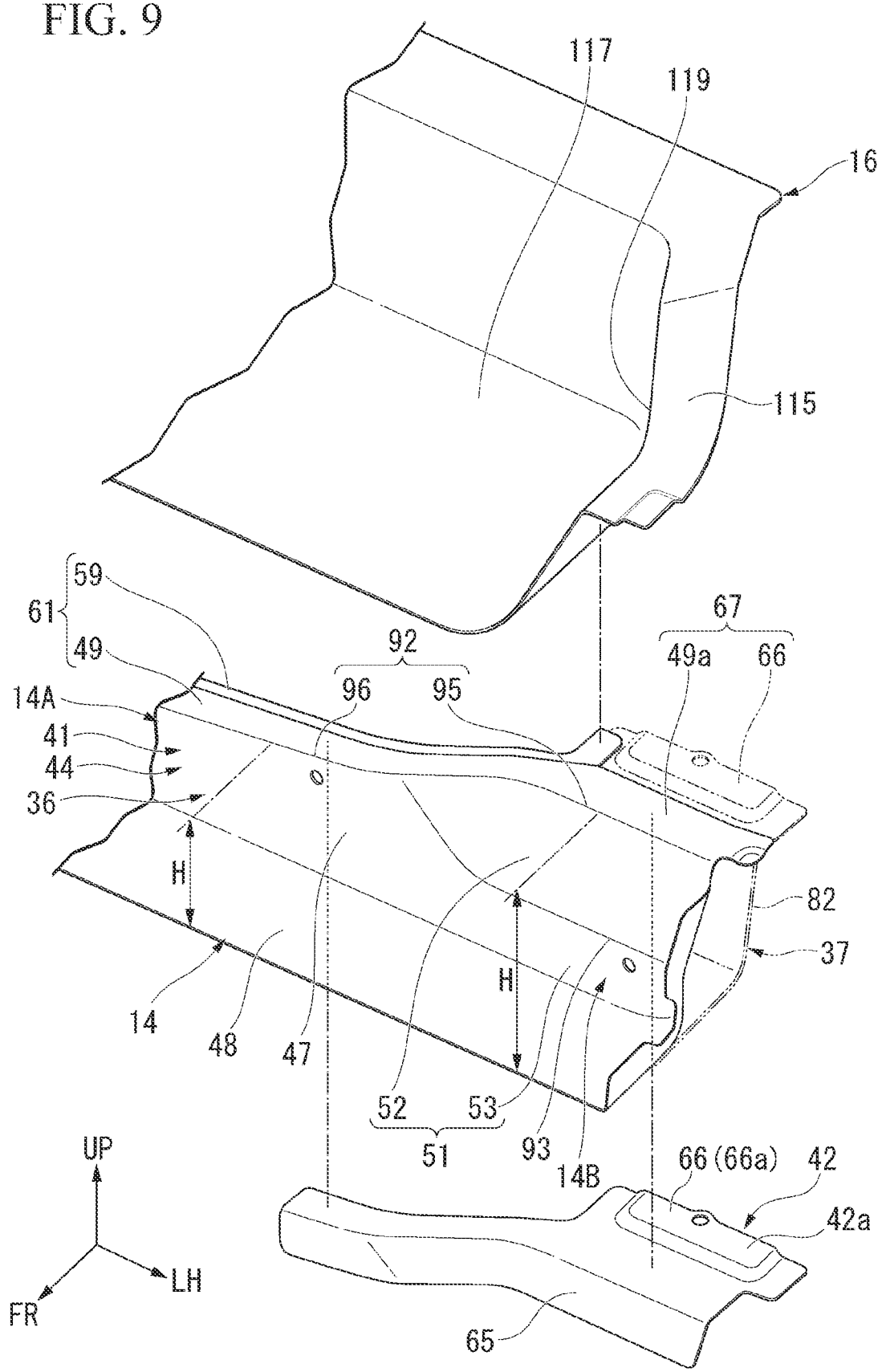
FIG. 9 is an exploded perspective view of the rear vehicle body structure according to the embodiment of the present invention with a first floor cross member and a battery housing part disassembled.

As illustrated in FIGS. 7 to 9, the stiffener 42 is connected to a left end portion and a right end portion of the first upper main body part 44 on an outer side in the vehicle width direction (specifically, an outer end portion of the upper front wall 47 and an outer end portion of the first top flange 49). That is, an end portion upper surface of the first upper member 36 on an outer side in the vehicle width direction is formed by the stiffener 42 separate from the upper main body 41. Further, the outer end portion of the upper front wall 47 includes the inclined wall 52.

The stiffener 42 includes a first stiffener part 65 and a second stiffener part 66 provided on an upper portion of the first stiffener part 65. The first stiffener part 65 is connected from a vehicle rear side along an upper portion of the outer end portion of the upper front wall 47. The second stiffener part 66 is formed from an upper side of the first stiffener part 65 toward the rear of the vehicle, and is connected to the outer end portion of the first top flange 49 from below.

As described above, the stiffener 42 forms an end portion upper surface part (end portion upper surface) of the first upper member 36 by being connected to the upper portion of the outer end portion of the upper front wall 47 and the outer end portion of the first top flange 49. The stiffener 42 is set to have higher strength and rigidity than the upper main body 41 by, for example, forming a plate thickness thereof larger than that of the upper main body 41 or using a material having higher strength and rigidity than that of the upper main body 41. Further, in the stiffener 42, the first stiffener part 65 and the second stiffener part 66 are formed in a V-shaped cross section. Therefore, the stiffener 42 is set to have higher strength and rigidity.

Here, in the second stiffener part 66, of the outer end portion on an outer side in the vehicle width direction, a stiffener rear end portion 66a on a vehicle rear side protrudes from an outer end portion 49a of the first top flange 49 toward the rear of the vehicle. Due to the outer end portion 49a of the first top flange 49 and the second stiffener part 66, an upper top outer end portion 67 of the first upper member 36 is formed to be continuous from the upper top part 61 toward an outer side in the vehicle width direction.

<First Lower Member>

As illustrated in FIGS. 3, 6, and 7, the first lower member 37 includes a lower central part 71 and the extension parts 72 provided at both ends of the lower central part 71 in the vehicle width direction. The lower central part 71 forms a central part of the first lower member 37 in the vehicle width direction. The lower central part 71 is connected to a central part 36a (hereinafter, also referred to as an upper central part 36a) of the first upper member 36 in the vehicle width direction from below.

Specifically, the lower central part 71 includes a central bottom portion 74 provided below the upper central part 36a, a central rear wall 75 provided on a vehicle rear side of the central bottom portion 74, a first central flange 76 provided on a vehicle front side of the central bottom portion 74, and a second central flange 77 provided at an upper portion of the central rear wall 75.

Further, the upper central part 36a is disposed between a left upper outer end portion 36b and a right upper outer end portion 36b of the first upper member 36 in the vehicle width direction, and is formed to be continuous between the upper outer end portions 36b.

The central bottom portion 74 is disposed below the upper front wall 47 in the upper central part 36a and at a position facing the upper top part 61. The central rear wall 75 is raised upward from a rear side of the central bottom portion 74 and is disposed on a vehicle rear side at a distance from the upper front wall 47. The first central flange 76 protrudes from a front side of the central bottom portion 74 to the front of the vehicle. The second central flange 77 is formed from an upper side of the central rear wall 75 toward the rear of the vehicle.

That is, the lower central part 71 is formed to have a crank-shaped cross section by the central bottom portion 74, the central rear wall 75, the first central flange 76, and the second central flange 77.

The first central flange 76 of the lower central part 71 is connected to the first upper flange 48 of the upper central part 36a from below, and the second central flange 77 of the lower central part 71 is connected to the second upper flange 58 of the upper central part 36a from below.

Thereby, due to the upper central part 36a and the lower central part 71, a central part 14A of the first floor cross member 14 in the vehicle width direction (hereinafter, also referred to as a cross member central part 14A) is formed in a closed cross section having a rectangular cross section.

The extension parts 72 are connected to the left end portion (end portion) and the right end portion (end portion) of the lower central part 71 in the vehicle width direction. The extension parts 72 form a left lower end portion (lower end portion) and a right lower end portion (lower end portion) of the first lower member 37 in the vehicle width direction.

The extension parts 72 each include an extension bottom portion 81 provided below the upper front wall outer end portion 51, an extension rear wall 82 provided on a vehicle rear side of the extension bottom portion 81, a first extension flange 83 provided on a vehicle front side of the extension bottom portion 81, and a second extension flange 84 provided on an upper portion of the extension rear wall 82.

The extension bottom portion 81 is disposed below the upper front wall outer end portion 51 (that is, the inclined wall 52 and the outer front wall 53) and at a position offset (displaced) toward a vehicle front side with respect to the upper top outer end portion 67. The extension rear wall 82 is raised to be inclined upward from a rear side of the extension bottom portion 81 toward the rear of the vehicle.

The extension rear wall 82 is disposed on a vehicle rear side at a distance from the upper front wall outer end portion 51 positioned on a vehicle front side. The first extension flange 83 is formed from a front side of the extension bottom portion 81 toward the front of the vehicle. The second extension flange 84 is formed from an upper side of the extension rear wall 82 toward the rear of the vehicle.

In the extension part 72, the first extension flange 83 is connected to the first upper flange 48 of the upper outer end portion 36*b* from below. Further, in the extension part 72, the second extension flange 84 is connected to a rear end portion (specifically, the second stiffener part 66) of the upper top outer end portion 67 from below.

Therefore, due to the upper front wall outer end portion 51, the upper top outer end portion 67, and the extension part 72, a widened part 14B is formed in a closed cross section having a rhombus-shaped cross section at a left outer end portion and a right outer end portion of the first floor cross member 14 in the vehicle width direction.

<Widened Part>

As illustrated in FIGS. 2 and 5, the widened parts 14B are formed to be continuous with a left end portion and a right end portion of the cross member central part 14A in the vehicle width direction. The first floor cross member 14 is formed by the left widened part 14B, the right widened part 14B, and the cross member central part 14A. That is, the first floor cross member 14 includes the left widened part 14B, the right widened part 14B, and the cross member central part 14A.

As described above, the first floor cross member 14 is formed in a rectangular closed cross section that is continuous in the vehicle width direction by the left widened part 14B, the right widened part 14B, and the cross member central part 14A (in other words, the first upper member 36 and the first lower member 37). That is, the first floor cross member 14 is a member having high strength and rigidity constituting a framework of the vehicle body.

Figure 10:
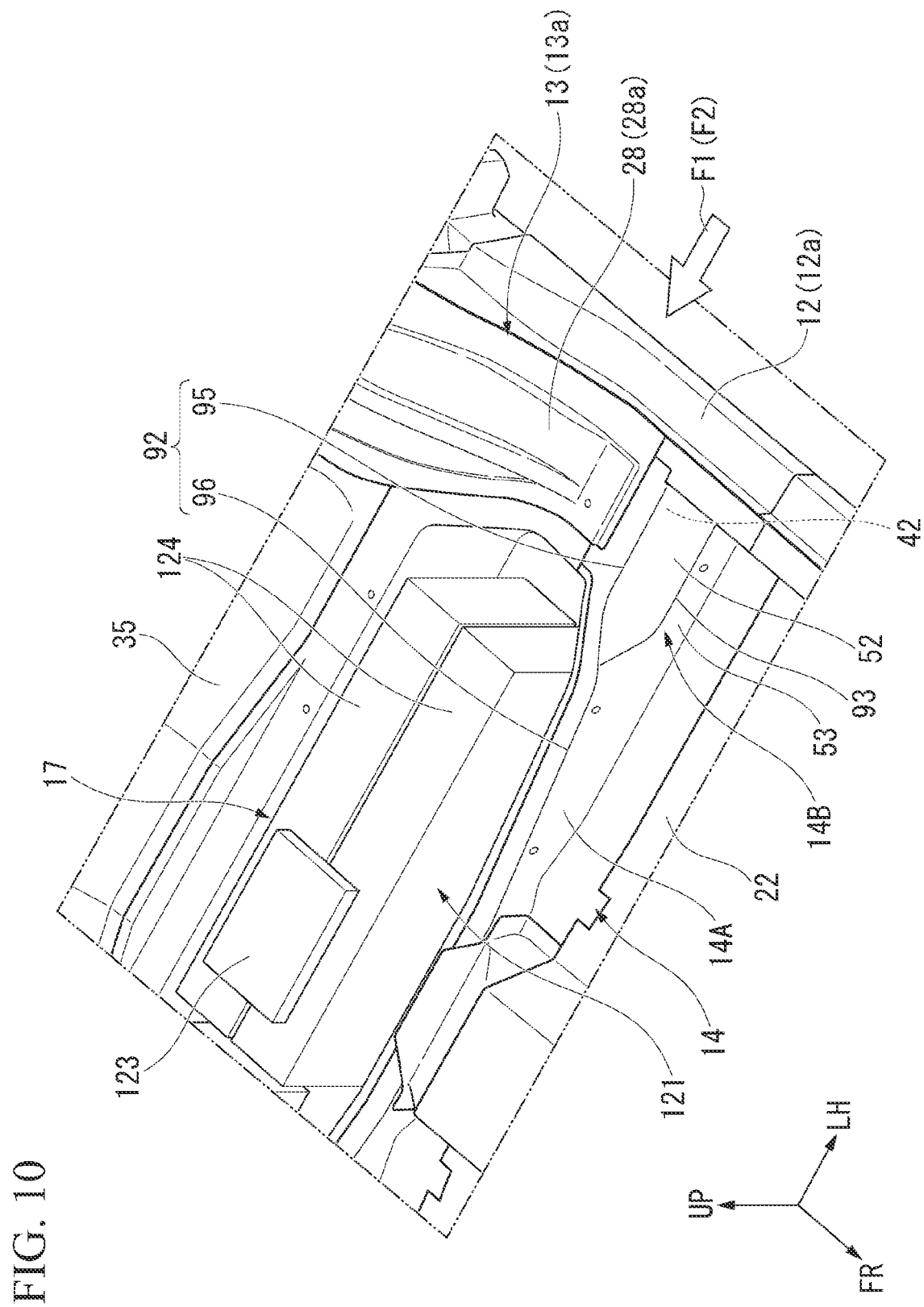
FIG. 10 is an enlarged plan view of the X portion of FIG. 1.

As illustrated in FIGS. 8 to 10, the first floor cross member 14 is formed so that a height H (see also FIGS. 6 and 7) increases upward (toward an upper side of the vehicle) toward an outer side in the vehicle width direction, and the widened part 14B is set to be the highest.

The widened part 14B is provided, for example, from a position P1 that overlaps a battery module 121 to be described later in the vehicle front-rear direction toward an outer side in the vehicle width direction, and a width W in the vehicle front-rear direction (see also FIG. 6) is made larger than that of the cross member central part 14A.

Further, the widened part 14B is set to have a largest vehicle front-rear direction width W1 (see also FIG. 7) at a part 14C (hereinafter, also referred to as a maximum widened part 14C) that overlaps a front end 13*b* of the rear side frame 13 in the vehicle width direction.

As illustrated in FIGS. 3, 7, and 9, the frame front end portion 13*a* of the rear side frame 13 is connected to the extension rear wall 82 of the widened part 14B in a state of being abutted against the extension rear wall 82. Due to the connection of the extension rear wall 82 of the widened part 14B and the frame front end portion 13*a* of the rear side frame 13, a boundary part 88 between the widened part 14B and the rear side frame 13 is formed. The boundary part 88 is disposed at a position at which a region E overlaps the battery module 121 (to be described later) in the vehicle front-rear direction (that is, in a side view).

Here, a main part 42*a* of the stiffener 42 is connected to the upper top outer end portion 67 and the inclined wall 52 of the widened part 14B. Also, an inner end portion 42*b* of the stiffener 42 is connected to the upper front wall 47 and the first top flange 49 of the first upper main body part 44 adjacent to the widened part 14B. Therefore, the inner end portion 42*b* of the stiffener 42 extends inward in the vehicle width direction from a cross member end portion (that is, an outer end portion of the widened part 14B) on an outer side of the first floor cross member 14 in the vehicle width direction with respect to the widened part 14B.

<First Ridge Line and Second Ridge Line>

As illustrated in FIGS. 9 and 10, the first floor cross member 14 includes a first ridge line (ridge line) 92, and a second ridge line (another ridge line) 93 formed on a vehicle front side of the first ridge line 92. The first ridge line 92 is formed at an intersecting portion of the upper front wall 47 and the first top flange 49. The first ridge line 92 includes a first outer ridge line 95 formed on an outer side in the vehicle width direction, and a first center-side ridge line 96 formed on an inner side of the first outer ridge line 95 in the vehicle width direction.

The first outer ridge line 95 is formed at an intersecting portion of the inclined wall 52 of the upper front wall 47 and the outer end portion 49*a* of the first top flange 49 (that is, the upper top part 61). The first center-side ridge line 96 is formed at a portion in which a portion (central-side front wall) 54 of the upper front wall 47 on an inner side of the inclined wall 52 in the vehicle width direction intersect the first top flange 49.

As illustrated in FIGS. 8 and 10, the first outer ridge line 95 is offset (displaced) toward the rear of the vehicle with respect to the first center-side ridge line 96. Also, the first outer ridge line 95 is offset toward the rear of the vehicle with respect to the first center-side ridge line 96 from a battery outer end portion 121*a* on an outer side of the battery module 121 to be described later in the vehicle width direction. The first outer ridge line 95 extends obliquely from the first center-side ridge line 96 toward the rear of the vehicle and to an outer side in the vehicle width direction.

The second ridge line 93 is formed at an intersecting portion of the inclined wall 52 and the outer front wall 53. The second ridge line 93 is positioned below the first outer ridge line 95.

<Second Floor Cross Member>

As illustrated in FIGS. 2 to 4, the second floor cross member 15 is disposed on a vehicle rear side with respect to the power storage device 17 including the battery module 121 and the like to be described later. The second floor cross member 15 extends in the vehicle width direction to be connected to the left rear side frame 13 and the right rear side frame 13.

Specifically, the second floor cross member 15 includes a second upper member 101 forming an upper portion of the second floor cross member 15, and a second lower member 102 forming a lower portion of the second floor cross member 15. The second upper member 101 is concurrently used as a housing rear end portion 114 of the battery housing part 16 to be described later. The second lower member 102 is connected to the second upper member 101.

Specifically, as illustrated in FIG. 6, the second upper member 101 is formed in an L-shaped cross section by bending an upper corner portion 103 to protrude toward the front of the vehicle and upward. The second lower member 102 is formed in a substantially L-shaped cross section by bending a lower corner portion 106 to protrude toward the rear of the vehicle and downward.

A lower end portion 104 of the second upper member 101 and a lower flange 107 of the second lower member 102 are connected to each other. Also, a rear flange 105 of the second upper member 101 and a rear flange 108 of the second lower member 102 are connected to each other. Thereby, the second floor cross member 15 is formed to have a rectangular closed cross section by the second upper member 101 and the second lower member 102. The second floor cross member 15 is a member having high strength and rigidity constituting a framework of the vehicle body. Further, a front end portion of the rear floor panel 35 is connected to the rear flange 105 from above.

<Battery Housing Part and Power Storage Device>

Figure 11:
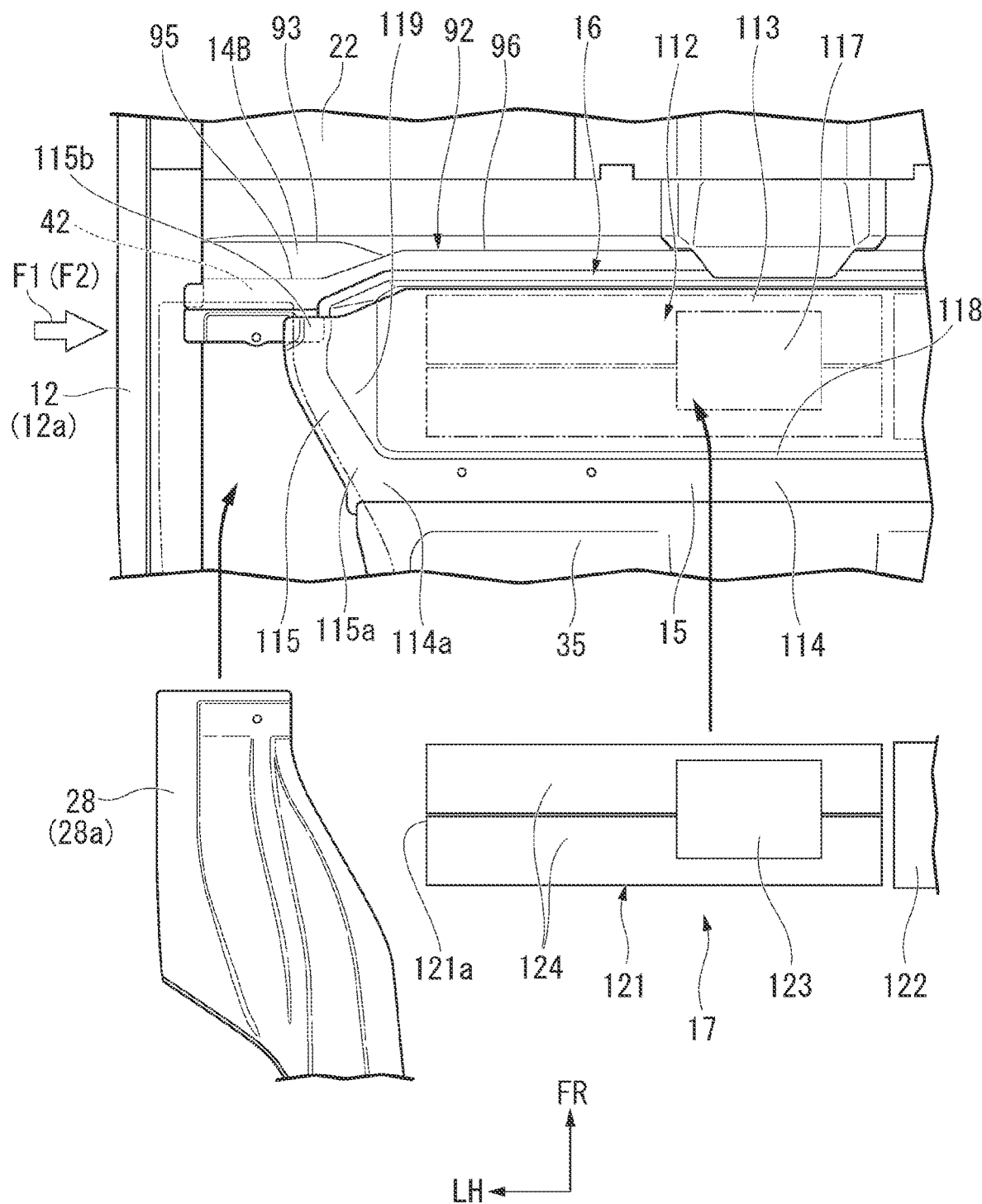
FIG. 11 is a plan view in which a power storage device and a rear side frame are disassembled from the rear vehicle body structure of FIG. 6.

As illustrated in FIGS. 2, 6, and 11, the battery housing part 16 is surrounded by the first floor cross member 14, the second floor cross member 15, the left rear side frame 13, and the right rear side frame 13. The power storage device 17 is housed in the battery housing part 16. Specifically, the battery housing part 16 includes a housing main body part 112, a housing front end portion 113 provided on a vehicle front side of the housing main body part 112, the housing rear end portion 114 provided on a vehicle rear side of the housing main body part 112, and housing end portions 115 provided at both ends of the housing main body part 112 in the vehicle width direction.

The housing main body part 112 includes a housing bottom portion 117, a housing rear wall 118 provided on a vehicle rear side of the housing bottom portion 117, and housing side walls (side walls) 119 provided at both ends of the housing bottom portion 117 in the vehicle width direction. The housing bottom portion 117 is disposed substantially horizontally below the power storage device 17. The housing front end portion 113 is formed from a front side of the housing bottom portion 117 toward the front of the vehicle. The housing front end portion 113 is connected to the second upper flange 58 (that is, the first floor cross member 14) of the first upper member 36 from above.

Also, the housing rear wall 118 is formed upward from a rear side of the housing bottom portion 117. The housing rear wall 118 is disposed on a vehicle rear side of the power storage device 17. The housing rear end portion 114 is formed on an upper side of the housing rear wall 118. The housing rear end portion 114 is concurrently used as the second upper member 101 of the second floor cross member 15. That is, the housing rear wall 118 is connected to the second upper member 101 (the second floor cross member 15).

A left housing side wall 119 is formed upward at a left end portion of the housing bottom portion 117. The left housing side wall 119 is disposed on a left outer side in the vehicle width direction of the power storage device 17 (specifically, the battery outer end portion 121a on an outer side of the battery module 121, to be described later, in the vehicle width direction). The left housing end portion 115 is formed on an upper side of the left housing side wall 119 toward an outer side in the vehicle width direction. Hereinafter, the left housing end portion 115 may be abbreviated as "housing end portion 115", and the left housing side wall 119 may be abbreviated as "housing side wall 119."

A rear end portion 115a of the housing end portion 115 is connected to a left outer end portion (end portion) 114a of the housing rear end portion 114 (that is, the second floor cross member 15). Also, a front end portion 115b of the housing end portion 115 is connected to the stiffener 42 (that is, the widened part 14B) from above. Further, the housing end portion 115 is connected to the frame front end portion 13a of the left rear side frame 13 from below.

That is, the housing side wall 119 is connected to the widened part 14B from a left outer end portion of the second floor cross member 15 toward the front of the vehicle via the housing end portion 115.

The right housing end portion 115 and the right housing side wall 119 are formed to be substantially bilaterally symmetrical with the left housing end portion 115 and the left housing side wall 119. Therefore, detailed description of the right housing end portion 115 and the right housing side wall 119 will be omitted.

As described above, an outer circumference of the battery housing part 16 is connected to the first floor cross member 14, the second floor cross member 15, the left rear side frame 13, and the right rear side frame 13. The power storage device 17 is housed (disposed) in the battery housing part 16.

The power storage device 17 includes, for example, the battery module 121, a blower fan (not illustrated), a high voltage junction board 122, an electronic control unit (ECU) 123, and the like. The battery module 121 includes, for example, a plurality of battery units 124. The battery units 124 are each formed, for example, by laminating a plurality of battery cells (not illustrated) in the vehicle width direction. Hereinafter, the battery module 121 may be abbreviated as "battery 121."

<Battery Cover>

Figure 12:
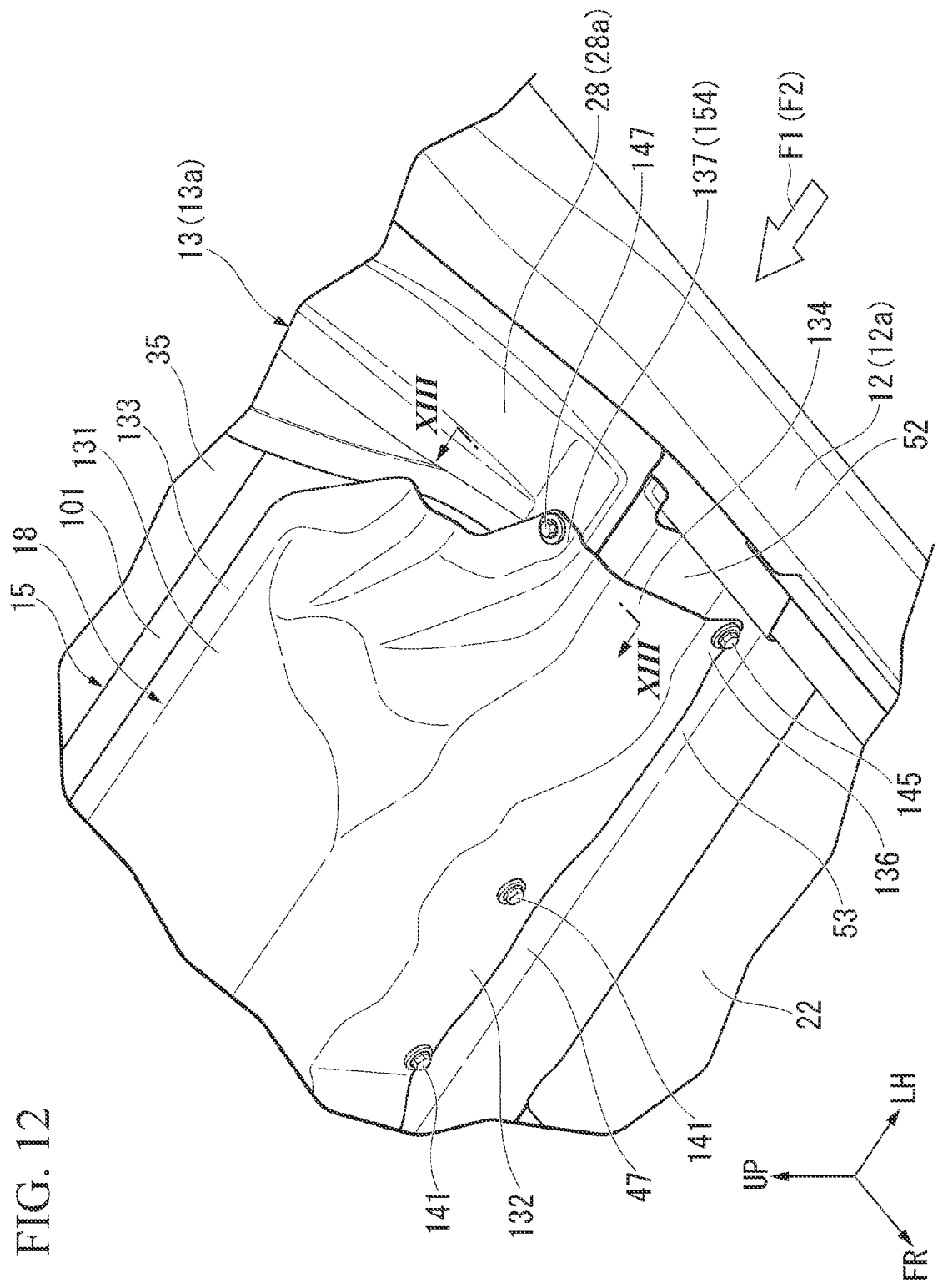
FIG. 12 is a perspective view in which the battery cover is connected to the first floor cross member and a second floor cross member of the rear vehicle body structure in the embodiment of the present invention.

As illustrated in FIGS. 1 and 12, an opening 16a of the battery housing part 16 is covered by the battery cover 18 from above. The battery cover 18 is a metal cover formed of a metal material to cover an upper portion of the power storage device 17. The battery cover 18 is connected to the first floor cross member 14 and the second floor cross member 15.

Specifically, the battery cover 18 includes a cover main body 131 positioned at an upper portion of the power storage device 17, a front connection part 132 provided at a front end of the cover main body 131 in the vehicle front-rear direction, a rear connection part 133 provided at a rear end of the cover main body 131 in the vehicle front-rear direction, and vehicle width outer connection parts 134 provided at both ends of the cover main body 131 in the vehicle width direction.

Further, the left vehicle width outer connection part 134 and the right vehicle width outer connection part 134 are portions that are substantially bilaterally symmetrical. Therefore, hereinafter, the left vehicle width outer connection part 134 will be abbreviated as "vehicle width outer connection part 134" and will be described in detail, and description of the right vehicle width outer connection part 134 will be omitted.

The cover main body 131 is bulged upward from the power storage device 17. The front connection part 132 is fixed (connected) to the upper front wall 47 of the first floor cross member 14 by being fastened with a fastening member such as, for example, a bolt 141 or a nut (not illustrated).

The rear connection part 133 is fixed (connected) to the second upper member 101 of the second floor cross member 15 by being fastened with a fastening member such as, for example, a bolt or a nut (both not illustrated).

Figure 13:
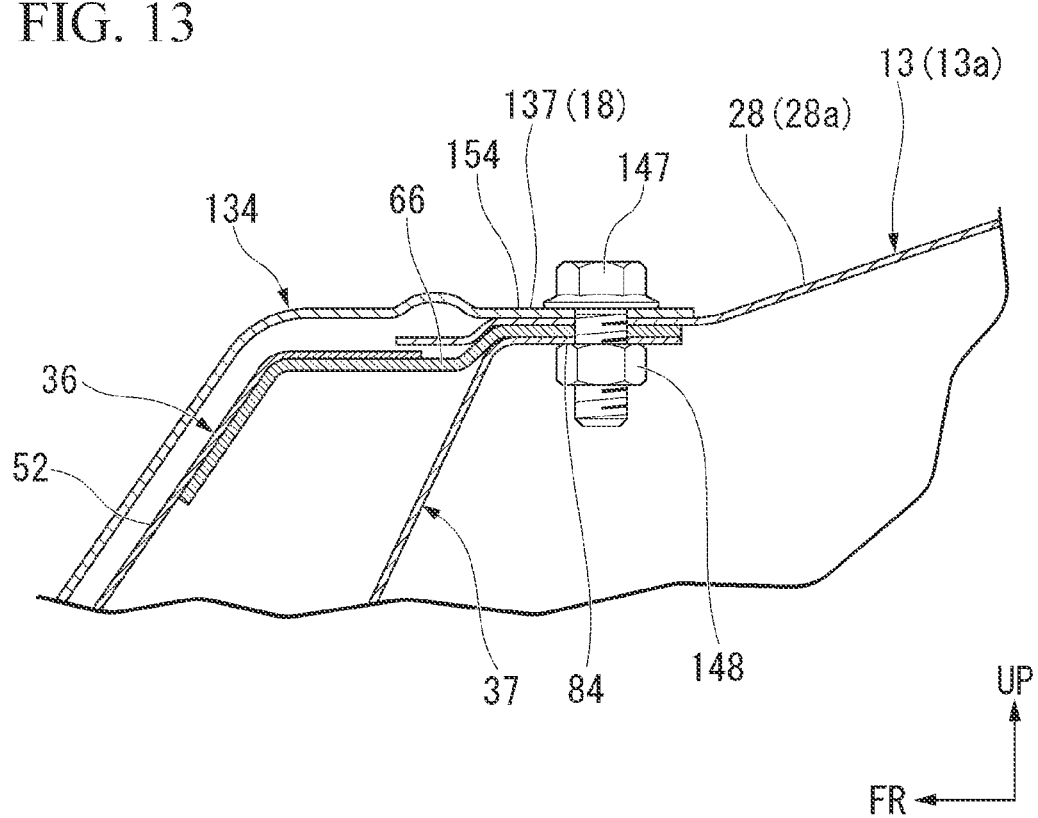
FIG. 13 is a cross-sectional view cut along line XIII-XIII of FIG. 12.

As illustrated in FIGS. 7, 12, and 13, the vehicle width outer connection part 134 is formed at a left end portion (that is, cover outer end portion) of the cover main body 131 on a left outer side in the vehicle width direction (outer side in the vehicle width direction). The vehicle width outer connection part 134 is connected across the inclined wall 52 in the vehicle front-rear direction. Specifically, the vehicle width outer connection part 134 includes a front fixing part (front connection part) 136 fixed to the upper front wall 47 and a rear fixing part (rear connection part) 137 extending from an upper portion of the front fixing part 136 toward the rear of the vehicle.

The front fixing part 136 is fixed (connected) to a portion (that is, the outer front wall 53) of the upper front wall 47 positioned below the inclined wall 52 by being fastened with a fastening member such as, for example, a bolt 145 and a nut 146.

The rear fixing part 137 is connected at a position at which three members of the upper frame front end portion 28a of the rear side frame upper 28, the second stiffener part 66 of the first upper member 36, and the second extension flange 84 of the first lower member 37 overlap in a vertical direction. Specifically, the rear fixing part 137 is fixed (connected) to the upper frame front end portion 28a, the second stiffener part 66, and the second extension flange 84 by being fastened with a fastening member such as, for example, a bolt 147 and a nut 148.

As described above, according to the rear vehicle body structure 10 of the embodiment, the following operation and effects can be obtained. In the following, a left side configuration of the vehicle body will be described in detail, and detailed description of a right side configuration will be omitted.

As illustrated in FIGS. 7 and 8, the boundary part 88 between the widened part 14B of the first floor cross member 14 and the rear side frame 13 is disposed at a position at which it overlaps the battery 121 in the region E in a side view. Therefore, for example, a load F1 (hereinafter, also referred to as a lateral collision load F1) input from the outside of the battery 121 in the vehicle width direction due to a lateral collision can be received at the boundary part 88. Thereby, the lateral collision load F1 can be efficiently transmitted from the boundary part 88 to a center side of the first floor cross member 14 in the vehicle width direction, and the lateral collision load F1 can be supported by the first floor cross member 14.

Therefore, an amount of deformation of a vehicle body lateral portion (for example, the widened part 14B, the rear side frame 13, the side sill 12, and the like) positioned on an outer side of the battery 121 in the vehicle width direction can be reduced, and thereby damage to (deformation of) the battery 121 can be minimized to protect the battery 121. In this way, when the boundary part 88 between the widened part 14B and the rear side frame 13 is disposed at a position at which it overlaps the battery 121, the lateral collision load F1 can be supported by the first floor cross member 14 without reinforcing, for example, the rear side frame 13 with a reinforcing member. As a result, weight reduction of the vehicle body can be achieved.

Here, for example, when an excessive lateral collision load F2 is input by a lateral collision, it is conceivable that the widened part 14B (that is, the first floor cross member 14) will bend to a side of the rear side frame 13. On the other hand, the widened part 14B is in contact with the rear side frame 13 because the boundary part 88 with the rear side frame 13 is formed. Therefore, for example, when the excessive lateral collision load F2 is input by a lateral collision, the widened part 14B can be supported by the rear side frame 13 so that bending (collapse) of the widened part 14B is suppressed.

Thereby, the widened part 14B being bent to a side of the rear side frame 13 (that is, a side of the battery 121) by the excessive lateral collision load F2 can be suppressed by the rear side frame 13, and the excessive lateral collision load F2 can be transmitted to the center side of the first floor cross member 14. Also, when the collapse of the widened part 14B is suppressed, the widened part 14B can be suitably deformed by the excessive lateral collision load F2 to absorb impact energy due to the excessive lateral collision load F2. Therefore, even for the excessive lateral collision load F2, damage to (deformation of) the battery 121 can be minimized to protect the battery 121.

Also, as illustrated in FIGS. 7 and 10, the inclined wall 52 is formed on a front surface of the widened part 14B. Therefore, the intersecting portion of the inclined wall 52 and the outer front wall 53 is formed in a V shape protruding toward the front of the vehicle on, for example, the front surface of the widened part 14B. That is, the second ridge line (ridge line) 93 substantially extending in the vehicle width direction can be formed by the intersecting portion. Thereby, a ridge line of the first floor cross member 14 can be increased. Therefore, the lateral collision load F1 input to an end portion (that is, the widened part 14B) of the first floor cross member 14 can be efficiently transmitted to the center side of the first floor cross member 14.

Also, the lateral collision load F1 can also be transmitted to the front floor panel 22 provided on a vehicle front side of the first floor cross member 14.

Here, for example, the end portion (the widened part 14B) of the first floor cross member 14 is positioned at a rear lower portion of an opening for a rear side door. Therefore, when the inclined wall 52 is formed on the front surface of the widened part 14B, a large foot space can be secured on an outer side of the passenger compartment in the vehicle width direction. Thereby, it is possible to make boarding easier for an occupant when the occupant gets in and out of the passenger compartment.

Further, as illustrated in FIGS. 9 and 10, in the first ridge line 92 of the first floor cross member 14, the first outer ridge line 95 on a side of the inclined wall 52 (that is, the widened part 14B) is offset toward the rear of the vehicle with respect to the first center-side ridge line 96 on a center side in the vehicle width direction. Therefore, the first outer ridge line 95 can be brought closer to the battery 121 side in the vehicle front-rear direction. Thereby, for example, the lateral collision load F1 input from the outside of the battery 121 in the vehicle width direction by a lateral collision can be received by the first outer ridge line 95 and efficiently transmitted to the first center-side ridge line 96. That is, the lateral collision load F1 can be efficiently transmitted to the center side of the first floor cross member 14.

In addition, as illustrated in FIGS. 8 and 10, the second ridge line 93 is formed on a lower side of the first outer ridge line 95. Therefore, for example, the lateral collision load F1 input from the outside of the battery 121 in the vehicle width direction by a lateral collision can be received by the first outer ridge line 95 and the second ridge line 93. Thereby, the lateral collision load F1 can be more efficiently transmitted to the center side of the first floor cross member 14.

In addition, as illustrated in FIGS. 7 and 8, the maximum widened part 14C of the widened part 14B is formed to overlap the front end 13b of the rear side frame 13 in the vehicle width direction, and the vehicle front-rear direction width W1 of the maximum widened part 14C is set to be the largest in the widened part 14B. Therefore, for example, the widened part 14B can be brought into contact with or closer to the front end 13b of the rear side frame 13 in the vehicle front-rear direction.

Thereby, bending (collapsing) of the widened part 14B to a side of the rear side frame 13 due to the lateral collision load F1 can be suppressed by the rear side frame 13. Therefore, the lateral collision load F1 can be efficiently transmitted to the center side of the first floor cross member 14, and the lateral collision load F1 can be supported by the first floor cross member 14.

Further, for example, even when the excessive lateral collision load F2 is input by a lateral collision, collapsing of the widened part 14B to the side of the rear side frame 13 due to the lateral collision load F2 can be suppressed by the rear side frame 13. Therefore, the excessive lateral collision load F2 can be efficiently transmitted to the center side of the first floor cross member 14. Also, when the collapse of the widened part 14B is suppressed, the widened part 14B (particularly, the maximum widened part 14C) can be suitably deformed by the excessive lateral collision load F2 to absorb impact energy due to the excessive lateral collision load F2.

Also, as illustrated in FIGS. 2 and 11, the battery housing part 16 is formed to be surrounded by the first floor cross member 14, the second floor cross member 15, the left rear side frame 13, and the right rear side frame 13. The battery 121 is disposed in the battery housing part 16, and the housing side wall 119 of the battery housing part 16 is connected to the widened part 14B from the left outer end portion 114a of the second floor cross member 15 toward the front of the vehicle via the housing end portion 115.

Therefore, for example, the lateral collision load F1 input to the side of the widened part 14B can be transmitted to the first floor cross member 14 and can be transmitted to the second floor cross member 15 through the housing side wall 119 of the battery housing part 16.

That is, the lateral collision load F1 can be efficiently transmitted to the first floor cross member 14 and the second floor cross member 15. Thereby, the lateral collision load F1 can be supported by the first floor cross member 14 and the second floor cross member 15. Therefore, an amount of deformation of the vehicle body lateral portion (for example, the widened part 14B, the rear side frame 13, the side sill 12, and the like) positioned on an outer side of the battery 121 in the vehicle width direction can be reduced, and thereby damage to (deformation of) the battery 121 can be minimized to protect the battery 121.

Further, as illustrated in FIGS. 7, 9, and 10, the height H of the widened part 14B is set to be the highest in the first floor cross member 14. Therefore, the strength and rigidity can be enhanced by securing a large cross-sectional area of the widened part 14B. Thereby, the widened part 14B can be suitably deformed by the lateral collision load F1 to absorb impact energy due to the lateral collision load F1. Therefore, damage to (deformation of) the battery 121 due to the lateral collision load F1 can be minimized to protect the battery.

Also, the first floor cross member 14 is formed so that the height H increases toward an upper side of the vehicle toward an outer side in the vehicle width direction.

Therefore, in the first floor cross member 14, the height H of the cross member central part 14A on an inner side of the widened part 14B in the vehicle width direction (see also FIG. 6) can be suppressed to be lower than the height H of the widened part 14B. Thereby, a space for passing wirings of the battery 121 can be secured in the cross member central part 14A.

In addition, as illustrated in FIGS. 1 and 12, the battery cover 18 made of a metal covering an upper portion of the battery 121 is connected to the first floor cross member 14 and the second floor cross member 15. Also, the vehicle width outer connection part 134 of the battery cover 18 is connected across the inclined wall 52 (see also FIG. 7). When the battery cover 18 is made of a metal, the strength and rigidity of the battery cover 18 can be enhanced. Therefore, the inclined wall 52 of the widened part 14B can be reinforced with the vehicle width outer connection part 134 having high strength and rigidity to enhance the strength and rigidity of the inclined wall 52 (that is, the first floor cross member 14).

Thereby, the lateral collision load F1 can be transmitted to the metal battery cover 18 through the widened part 14B and the vehicle width outer connection part 134, and the lateral collision load F1 can be supported by the battery cover 18. Therefore, deformation of the first floor cross member 14 due to the lateral collision load F1 can be suppressed, and thereby damage to (deformation of) the battery 121 can be minimized to protect the battery 121.

Also, as illustrated in FIGS. 12 and 13, the rear fixing part 137 of the vehicle width outer connection part 134 of the battery cover 18 is connected to the rear side frame 13 (upper frame front end portion 28a) by being fastened with, for example, the bolt 147, the nut 148, and the like. The rear side frame 13 is connected to the second floor cross member 15. Therefore, the first floor cross member 14, the rear side frame 13, and the second floor cross member 15 can be connected by the battery cover 18.

Thereby, the lateral collision load F1 can be transmitted to peripheral members of the battery constituted by the first floor cross member 14, the rear side frame 13, the second floor cross member 15, and the battery cover 18. Therefore, the strength and rigidity of the peripheral members of the battery 121 (see FIG. 10) with respect to the lateral collision load F1 can be enhanced, and thereby damage to (deformation of) the battery 121 can be minimized to protect the battery 121.

Here, the upper frame front end portion 28a of the rear side frame upper 28, the second stiffener part 66 of the first upper member 36, and the second extension flange 84 of the first lower member 37 overlap in the vertical direction. The rear fixing part 137 of the vehicle width outer connection part 134 is connected to a position, at which the upper frame front end portion 28a, the second stiffener part 66, and the second extension flange 84 overlap each other, from above by being fastened with, for example, the bolt 147, the nut 148, and the like.

Therefore, four members of the rear fixing part 137, the rear side frame upper 28, the first upper member, and the first lower member can overlap and be connected with, for example, the bolt 147, the nut 148, and the like. Thereby, strength and rigidity of a connection part 154 in which the four members overlap and are connected can be enhanced, and transmission efficiency of the lateral collision load F1 can be improved.

Therefore, the lateral collision load F1 can be efficiently dispersed and transmitted to the four members of the rear fixing part 137 (that is, the battery cover), the rear side frame upper 28, the first upper member 36, and the first lower member 37. Thereby, damage to (deformation of) the battery 121 (see FIG. 10) can be minimized to protect the battery 121.

Further, the four members of the rear fixing part 137, the rear side frame upper 28, the first upper member 36, and the first lower member 37 overlap and are connected, and thereby the strength and rigidity of the connection part 154 of the four members are enhanced. Thereby, for example, a load input from a rear seat (not illustrated) disposed on an upper portion of the battery cover 18 can be supported by the connection part 154 of the four members, and a ride comfort of an occupant seated on the seat can be improved.

In addition, as illustrated in FIGS. 9, 12, and 13, the end portion upper surface of the first upper member 36 on an outer side in the vehicle width direction is formed by the stiffener 42 that is separate from the upper main body 41. Further, strength and rigidity of the stiffener 42 are set higher than those of the upper main body 41. In addition, the inner end portion 42b of the stiffener 42 extends inward in the vehicle width direction with respect to the widened part 14B. Therefore, the end portion upper surface of the first upper member 36 on an outer side in the vehicle width direction is set to have high strength and rigidity due to the stiffener 42. The end portion upper surface of the first upper member 36 is a portion included in the widened part 14B. Thereby, strength and rigidity of the widened part 14B can be set high.

Also, the stiffener 42 of the first upper member 36 is connected to overlap three members of the rear fixing part 137 of the battery cover 18, the rear side frame upper 28, and the first lower member 37, and forms the connection part 154 together with the three members. Thereby, the strength and rigidity of the connection part 154 due to the four members can be further enhanced, and connection rigidity between the rear side frame 13 and the battery cover 18 can be enhanced.

In this way, when the strength and rigidity of the widened part are set to be high, and furthermore the connection rigidity between the rear side frame 13 and the battery cover 18 is enhanced, protection performance of the battery 121 against, for example, the lateral collision load F1 can be enhanced.

Further, the end portion upper surface of the first upper member 36 is formed by the stiffener 42 that is separate from the upper main body 41. Therefore, for example, when another stiffener corresponding to another model is selected, the upper main body 41 can be shared with another model. Thereby, when the stiffener is selected to correspond to another model, the upper main body 41 and the first lower member 37 constituting the main part of the first floor cross member can be shared by another model.

Further, the technical scope of the present invention is not limited to the above-described embodiment, and various modifications can be made without departing from the spirit of the present invention.

For example, in the embodiment described above, a case in which the fixing parts 136 and 137 are each fixed (connected) by being fastened with a fastening member such as the bolts 145 and 147 and the nuts 146 and 148 has been described. However, the present invention is not limited thereto, and the fixing parts 136 and 137 can be fixed using various fixing members. For example, screws or the like may be used instead of the bolts 145 and 147 and the nuts 146 and 148.

In addition, the components in the above-described embodiment can be appropriately replaced with well-known components within a range not departing from the spirit of the present invention, and the modified examples described above may be appropriately combined.

What is claimed is:

1. A rear vehicle body structure comprising:
    a first floor cross member disposed on a vehicle front side with respect to a battery and connected to a rear side frame extending in a vehicle front-rear direction on an outer side in a vehicle width direction; and
    a second floor cross member disposed on a vehicle rear side with respect to the battery, wherein
    the first floor cross member includes a widened part widened in the vehicle front-rear direction at an end portion and extending to a position at which it overlaps the battery, and
    a boundary part between the widened part and the rear side frame is disposed at a position at which it overlaps the battery in a side view.

2. The rear vehicle body structure according to claim 1, wherein the widened part includes an inclined surface inclined upward toward the rear of the vehicle on a front surface positioned on a vehicle front side.

3. The rear vehicle body structure according to claim 2, wherein
    the first floor cross member includes a ridge line formed at an intersecting portion of the front surface and a top part formed from the front surface toward the rear of the vehicle,
    the ridge line includes:
    a first outer ridge line formed at an intersecting portion of the inclined surface and the top part; and
    a first center-side ridge line formed at an intersecting portion of a portion of the front surface on an inner side of the inclined surface in the vehicle width direction and the top part, and
    the first outer ridge line is offset toward the rear of the vehicle with respect to the first center-side ridge line.

4. The rear vehicle body structure according to claim 3, wherein
    the first outer ridge line starts to be offset toward the rear of the vehicle with respect to the first center-side ridge line from a battery outer end portion of the battery on an outer side in the vehicle width direction, and
    the first floor cross member includes another ridge line formed at a portion of the front surface in which the inclined surface and another surface below the inclined surface intersect, and positioned on a lower side of the first outer ridge line.

5. The rear vehicle body structure according to claim 3, wherein the widened part is set to have a largest vehicle front-rear direction width at a portion at which it overlaps the rear side frame in the vehicle width direction.

6. The rear vehicle body structure according to claim 2, further comprising:
    a housing part surrounded by the first floor cross member, the second floor cross member, and the rear side frame to dispose the battery therein, wherein
    the housing part includes a side wall connected from an end portion of the second floor cross member to the widened part.

7. The rear vehicle body structure according to claim 1, wherein the first floor cross member is formed so that a height increases toward an upper side of the vehicle toward an outer side in the vehicle width direction, and the widened part is set to be the highest.

8. The rear vehicle body structure according to claim 5, further comprising:
a battery cover made of a metal connected to the first floor cross member and the second floor cross member and covering an upper portion of the battery, wherein
the battery cover includes a vehicle width outer connection part connected to a cover outer end portion on an outer side in the vehicle width direction across the inclined surface in the vehicle front-rear direction, and
the vehicle width outer connection part includes:
a rear fixing part connected to the rear side frame; and
a front fixing part connected to a portion below the inclined surface on the front surface of the first floor cross member positioned on a vehicle front side.

9. The rear vehicle body structure according to claim 8, wherein
the first floor cross member includes:
a first floor cross member upper formed by the front surface and the top part; and
a first floor cross member lower connected to the first floor cross member upper,
the rear side frame includes a rear side frame upper which closes an opening of an upper portion, and
the rear fixing part is connected to a position at which the rear side frame upper, the first floor cross member upper, and the first floor cross member lower overlap in a vertical direction.

10. The rear vehicle body structure according to claim 9, wherein
the first floor cross member upper includes:
an upper main body forming a main part of the first floor cross member upper; and
a stiffener connected to an end portion of the upper main body on an outer side in the vehicle width direction and forming an end portion upper surface of the first floor cross member upper, and
the stiffener is set to have higher rigidity than the upper main body, and an inner end portion thereof on an inner side in the vehicle width direction extends inward in the vehicle width direction from a cross member end portion on an outer side of the first floor cross member in the vehicle width direction with respect to the widened part.

* * * * *